United States Patent
Kanaoka et al.

(10) Patent No.: US 11,715,058 B2
(45) Date of Patent: Aug. 1, 2023

(54) INFORMATION SYSTEM, INFORMATION PROCESSING METHOD, AND STORAGE MEDIUM

(71) Applicant: TOYOTA JIDOSHA KABUSHIKI KAISHA, Toyota (JP)

(72) Inventors: Kei Kanaoka, Nagoya (JP); Shun Maeda, Nisshin (JP); Yoshihiro Murozaki, Nisshin (JP); Hiroko Tsujimura, Nagoya (JP); Daiki Kaneichi, Nisshin (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 315 days.

(21) Appl. No.: 16/228,900

(22) Filed: Dec. 21, 2018

(65) Prior Publication Data
US 2019/0220812 A1  Jul. 18, 2019

(30) Foreign Application Priority Data
Jan. 12, 2018  (JP) .................................. 2018-003608

(51) Int. Cl.
G06Q 10/0833 (2023.01)
G06Q 10/0832 (2023.01)
G07C 9/00 (2020.01)

(52) U.S. Cl.
CPC ..... *G06Q 10/0833* (2013.01); *G06Q 10/0832* (2013.01); *G07C 9/00896* (2013.01)

(58) Field of Classification Search
CPC ............................................... G07C 9/00896
(Continued)

(56) References Cited

U.S. PATENT DOCUMENTS 11,151,509 B1 * 10/2021 Mishra ............. G06Q 10/08355
2003/0125963 A1 * 7/2003 Haken ..................... H04L 29/06
705/26.1
(Continued)

FOREIGN PATENT DOCUMENTS

JP  2002-302257    10/2002
JP  2005-084848     3/2005
(Continued)

OTHER PUBLICATIONS

A method to deliver package with security credentials. Jul. 16, 2016. The IP.com Journal. pp. 1-2. https://priorart.ip.com/IPCOM/000246538. (Year: 2016).*

*Primary Examiner* — Jeff Zimmerman
*Assistant Examiner* — Hunter A Molnar
(74) *Attorney, Agent, or Firm* — Oblon, McClelland, Maier & Neustadt, L.L.P.

(57) ABSTRACT

An information system that manages collection from and delivery to one or more areas in a vehicle that can be used as a collection-delivery destination of an item, the information system includes: an acceptance unit configured to accept a request for collection and delivery of the item from and to the areas; an acquisition unit configured to acquire parking position information and attribute information; and a management unit configured to determine whether a delivery vehicle carrying the item will be able to arrive at a parking position based on the parking position information and the attribute information.

20 Claims, 7 Drawing Sheets

(58) Field of Classification Search
USPC .......................................................... 705/333
See application file for complete search history.

(56) References Cited

U.S. PATENT DOCUMENTS

| | | | | |
|---|---|---|---|---|
| 2015/0254611 | A1* | 9/2015 | Perez | G06Q 10/08355 |
| | | | | 705/5 |
| 2015/0324744 | A1 | 11/2015 | Fokkelman | |
| 2016/0012726 | A1* | 1/2016 | Wang | G08G 1/147 |
| | | | | 340/932.2 |
| 2016/0098871 | A1* | 4/2016 | Oz | G07C 9/00571 |
| | | | | 340/5.61 |
| 2016/0189098 | A1* | 6/2016 | Beaurepaire | H04W 12/0804 |
| | | | | 705/337 |
| 2017/0024688 | A1* | 1/2017 | Wiechers | G06Q 10/083 |
| 2017/0169385 | A1 | 6/2017 | High et al. | |
| 2017/0352124 | A1* | 12/2017 | Semsey | B60R 25/24 |
| 2018/0186333 | A1* | 7/2018 | Santiano | H04L 67/1097 |
| 2019/0102728 | A1* | 4/2019 | Lee | G06Q 10/087 |
| 2019/0311327 | A1* | 10/2019 | Habbaba | H04W 4/44 |
| 2020/0074396 | A1* | 3/2020 | Boccuccia | G06K 7/1426 |

FOREIGN PATENT DOCUMENTS

| | | | | |
|---|---|---|---|---|
| JP | 2006-206225 | | 8/2006 | |
| WO | WO-2016054200 A1 * | | 4/2016 | G06F 21/60 |

\* cited by examiner

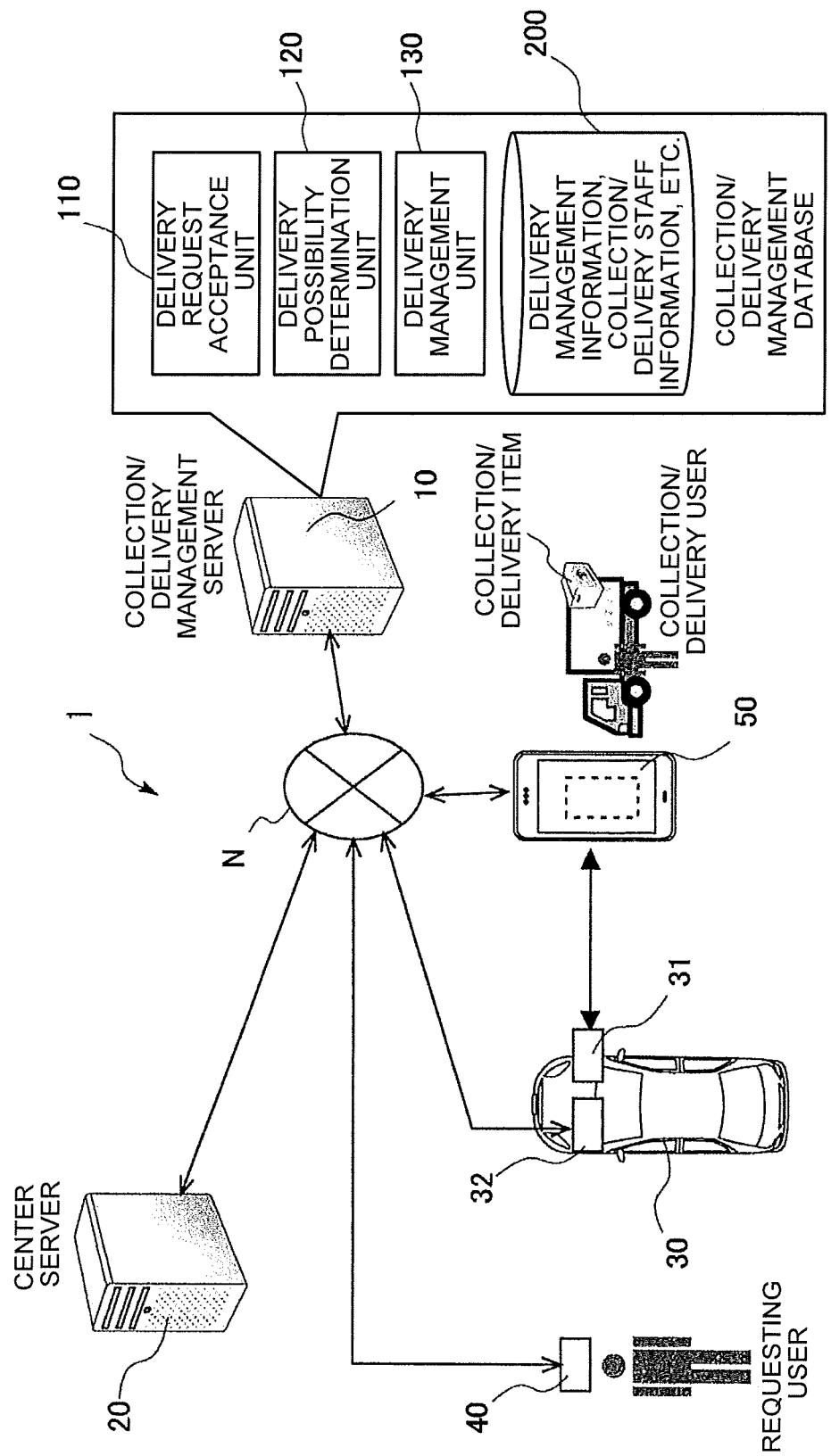

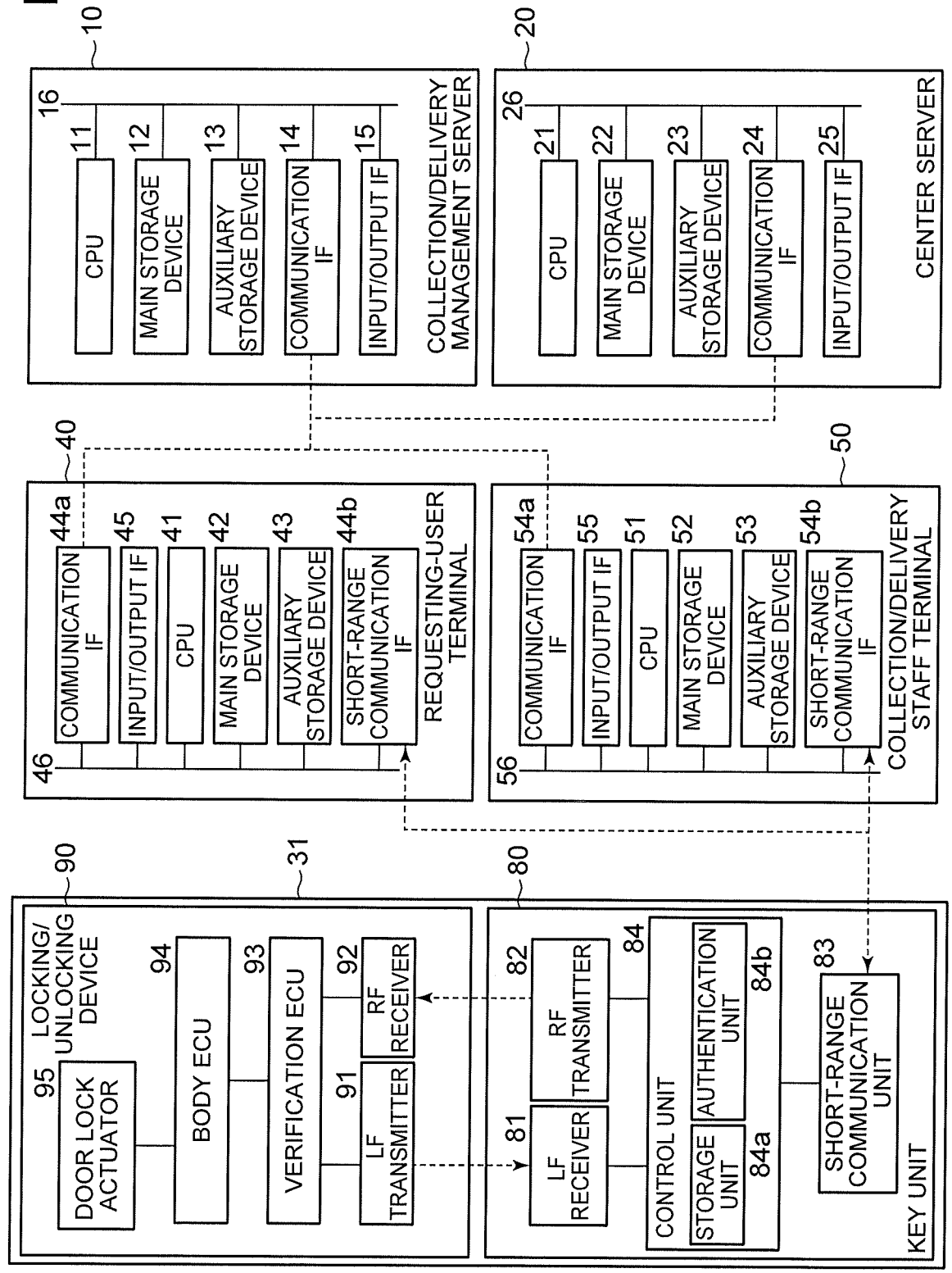

FIG. 3

| IDENTIFI-CATION NUMBER | VEHICLE MANU-FACTURER | VEHICLE TYPE | NUMBER | PARKING LOT ADDRESS | VEHICLE POSITION | COLOR | COLLECTION/ DELIVERY POSITION | COLLECTION/ DELIVERY DATE/TIME | COLLECTION/ DELIVERY CLASSIFI-CATION | RESTRICTIONS |
|---|---|---|---|---|---|---|---|---|---|---|
| S001 | ... | ... | xxyy | ...** STREET, ** WARD, ** CITY | LATITUDE (LA1), LONGITUDE (LO1) | WHITE | TRUNK | 2017/11/01 12:00– 15:00 | DELIVERY | •CANNOT ENTER PARKING LOT •USE PAY PARKING LOT (LATITUDE, LONGITUDE) |

FIG. 4

| VEHICLE ID | COLLECTION/ DELIVERY DATE/TIME | COLLECTION/ DELIVERY CLASSIFI- CATION | COLLECTION/ DELIVERY STATUS | BAGGAGE ATTRIBUTE | USER ID | USER TERMINAL | COLLECTION/ DELIVERY POSITION | PARKING LOT ADDRESS | VEHICLE POSITION | RESTRICTIONS |
|---|---|---|---|---|---|---|---|---|---|---|
| S001 | 2017/11/01 12:00– 15:00 | DELIVERY | COM- PLETED | ... | PA30X21 | ZZZZZ | TRUNK | | | |
| | ... | ... | ... | ... | ... | ... | ... | ...** STREET, ** WARD, ** CITY | LATITUDE (LA1), LONGITUDE (LO1) | •CANNOT ENTER PARKING LOT •USE PAY PARKING LOT (LATITUDE, LONGITUDE) |
| | 2017/11/29 14:00– 18:00 | COLLEC- TION | UNCOM- PLETED | ... | PA30X21 | ZZZZZ | PASSENGER- SEAT-SIDE REAR SEAT | | | |

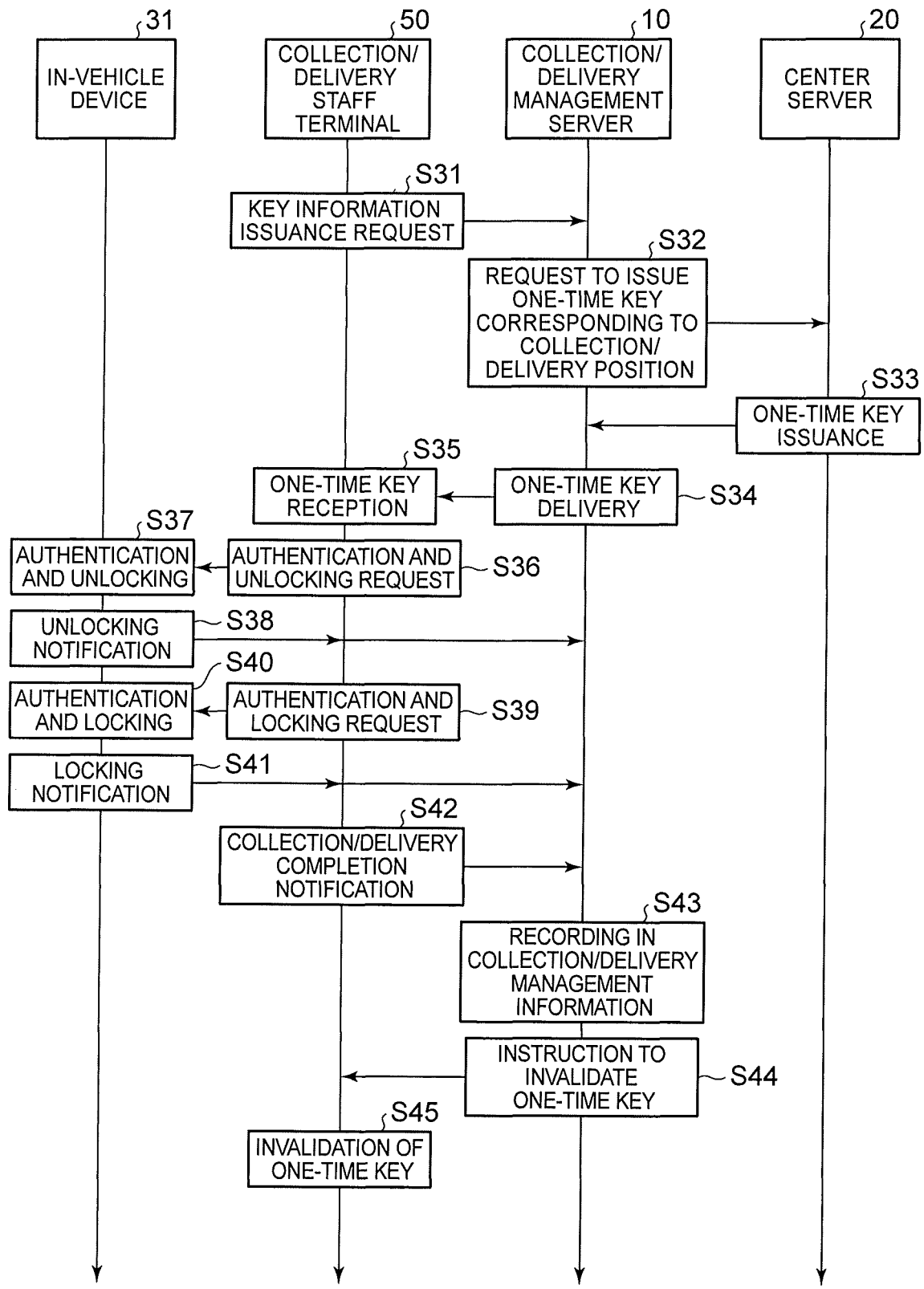

INFORMATION SYSTEM, INFORMATION PROCESSING METHOD, AND STORAGE MEDIUM

INCORPORATION BY REFERENCE

The disclosure of Japanese Patent Application No. 2018-003608 filed on Jan. 12, 2018 including the specification, drawings and abstract is incorporated herein by reference in its entirety.

BACKGROUND

1. Technical Field

The present disclosure relates to an information system, an information processing method, and a storage medium.

2. Description of Related Art

Recently, as a means for efficiently accepting and delivering a collection/delivery item (baggage) between a collection/delivery service user and a delivery company that collects and delivers items, the development of a trunk share system is under way in which the baggage room of a user-specified vehicle is used as the acceptance/delivery position of a collection/delivery item. For example, Japanese Patent Application Publication No. 2006-206225 (JP 2006-206225 A) discloses a technique that a professional-use communication device, provided in the delivery company vehicle, is used to perform two-way authentication with a delivery-item accepting vehicle at delivery-item delivery time for storing a delivery item in the trunk. This technique allows a delivery item to be accepted using a delivery-item accepting vehicle even if the recipient is absent.

SUMMARY

When a collection/delivery item is collected or delivered as described above, a vehicle used as the acceptance/delivery position of a collection/delivery item is parked in a contracted parking lot or at a position designated in advance for accepting the delivery item. However, in the technique disclosed in Japanese Patent Application Publication No. 2006-206225 (JP 2006-206225 A), a route by which the delivery vehicle carrying a collection/delivery item will arrive at the parking lot or at the parking position of the vehicle parked at the designated position is not taken into consideration. This sometimes leads to the situation in which the delivery vehicle carrying a collection/delivery item cannot arrive at the parking lot where the vehicle is parked or a designated position or cannot arrive from the entrance of the parking lot to the parking position. In such a case, there is a possibility that the collection/delivery item cannot be accepted or delivered using the baggage room.

The present disclosure provides a technique for improving the reliability of collection from and delivery to or from a vehicle parked in a predetermined position.

The information system according to a first aspect of the present disclosure manages collection from and delivery to one or more areas in a vehicle that can be used as a collection-delivery destination of an item. The information system includes: an acceptance unit configured to accept a request for collection of the item from the areas and delivery of the item to the areas; an acquisition unit configured to acquire parking position information and attribute information, the parking position information being related to a position of a designated vehicle, the attribute information being related to an attribute of a parking lot in which the designated vehicle is parked, and the designated vehicle being a vehicle designated as the collection-delivery destination of the item; and a management unit configured to determine whether a delivery vehicle carrying the item will be able to arrive at a parking position based on the parking position information and the attribute information, the parking position being a position where the designated vehicle is parked in the parking lot.

According to the aspect described above, when a collection/delivery request is accepted, it is possible to determine whether the delivery vehicle carrying the collection/delivery item will be able to arrive at the parking position where the vehicle is parked in the parking lot, based on the parking position information and the parking lot attribute information. Examples of one or more areas in the vehicle that can be used as the collection/delivery destination of a collection/delivery item include collection/delivery positions such as the bonnet, the passenger seat, the passenger-seat-side rear seat, the driver-seat-side rear seat, and the baggage room. Examples of the parking lot attribute include the configuration forms such as whether the parking lot is a pay parking lot or a free parking lot, whether the parking lot is a flat parking lot or a multilevel parking garage, and whether the parking lot is an indoor lot (the first floor or the underground floor etc. of an apartment) or an outdoor lot (outdoor parking area of an apartment), the necessity of approval when entering the parking lot, and limitations on height or weight imposed when entering the parking lot. As a result, the information system according to this embodiment improves the reliability of collection from or delivery to a vehicle parked in a predetermined position.

In the aspect described above, the management unit may be configured to output a result of determination indicating whether the delivery vehicle will be able to arrive at the parking position. The management unit may be configured to determine whether the collection from and delivery to the areas will be carried out based on a result of determination indicating whether the delivery vehicle will be able to arrive at the parking position. The management unit may be configured to: identify route information between the delivery vehicle and the parking position based on the parking position information; and determine whether the delivery vehicle will be able to arrive at the parking position based on at least one of the route information and the attribute information.

Examples of the route information include the road information on a plurality of routes leading to the designated parking lot (including road width, height limitation, weight limitation, traffic regulations such as a school zone) and the regulation information, such as the construction regulation, on the collection/delivery date and collection/delivery time zone. According to the aspect described above, it is possible to determine at least whether the delivery vehicle will be able to arrive at the designated parking lot in consideration of the road information and regulation information on a route to the designated parking lot. It is also possible to determine at least whether the delivery vehicle will be able to move close enough to the vehicle that is parked in the designated parking lot. Therefore, this configuration increases the accuracy of determination whether collection from or delivery to a vehicle parked in the designated parking lot can be carried out.

In the aspect described above, the route information may include at least one of traffic regulation information on a route between the delivery vehicle and the parking position and traffic restriction information on the route between the delivery vehicle and the parking position.

According to the aspect described above, it is possible to increase the accuracy of determination whether the delivery vehicle carrying a collection/delivery item will be able to arrive at the designated parking lot.

In the aspect described above, the attribute information may include at least one of information on height limitations imposed on a vehicle approaching the parking position, information on weight limitations imposed on the vehicle approaching the parking position, information on necessity of permission to approach the parking position, and information on expense incurrence.

According to the aspect described above, it is possible to increase the accuracy of determination whether the delivery vehicle carrying a collection/delivery item will be able to move close enough to a vehicle that is parked in the designated parking lot.

In the aspect described above, the management unit may be configured to identify a nearby parking lot near to the parking lot in which the designated vehicle is parked; and inquire of a terminal of a requesting user whether the designated vehicle can be moved to the nearby parking lot, the requesting user being a user who requests the collection of the item and the delivery of the item.

According to the aspect described above, since a collection/delivery item can be accepted or delivered at the nearby parking lot near to the designated parking lot, it is possible to increase the convenience of a user even when it is determined that the delivery vehicle will not be able to arrive at the designated parking lot.

In the aspect described above, the management unit may be configured to identify a nearby parking lot near to the parking lot in which the designated vehicle is parked; and inquire of a terminal of a requesting user about an approval of issuance of key information used for moving the designated vehicle to the nearby parking lot, the requesting user being a user who requests the collection of the item and the delivery of the item.

According to the aspect described above, even if a user of the collection/delivery service cannot move the vehicle for some reason on the collection/delivery date and time, the collection/delivery staff can move the vehicle, parked in the designated parking lot, for collecting or delivering the collection/delivery item and, after the collection/delivery, return the vehicle back to the designated parking lot. According to the aspect described above, it is possible to provide the collection/delivery service that is more convenient.

In the aspect described above, the management unit may be configured to inquire of a terminal of a requesting user about at least one of an approval of an additional expense required to approach the parking position and an approval of an additional expense required to use a nearby parking lot near to the parking lot in which the designated vehicle is parked, the requesting user being a user who requests the collection of the item and the delivery of the item.

According to the aspect described above, it is expected to improve the usability of a requesting user who requests the collection/delivery of a collection/delivery item.

The information processing method according to a second aspect of the present disclosure is an example of the information processing method executed by a computer of the information system that manages collection from or delivery to one or more areas in a vehicle that can be used as the collection/delivery destination of a collection/delivery item. The information processing method includes: accepting, by a circuitry, a request for collection of an item from one or more areas in a vehicle and delivery of the item to the areas, the circuitry being a circuitry of an information system that manages the collection from and delivery to the areas, and the vehicle being a vehicle that can be used as a collection-delivery destination of the item; acquiring, by the circuitry, parking position information and attribute information, the parking position information being related to a position of a designated vehicle, the attribute information being related to an attribute of a parking lot in which the designated vehicle is parked, and the designated vehicle being a vehicle designated as the collection-delivery destination of the item; and determining, by the circuitry, whether a delivery vehicle carrying the item will be able to arrive at a parking position based on the parking position information and the attribute information, the parking position being a position where the designated vehicle is parked in the parking lot.

The non-transitory storage medium storing a program according to a third aspect of the present disclosure wherein the program causes a circuitry of an information system that manages collection from and delivery to one or more areas in a vehicle that can be used as a collection-delivery destination of an item to accept a request for collection of the item from the areas and delivery of the item to the areas; acquire parking position information and attribute information, the parking position information being related to a position of a designated vehicle, the attribute information being related to an attribute of a parking lot in which the designated vehicle is parked, and the designated vehicle being a vehicle designated as the collection-delivery destination of the item; and determine whether a delivery vehicle carrying the item will be able to arrive at a parking position based on the parking position information and the attribute information, the parking position being a position where the designated vehicle is parked in the parking lot.

The present disclosure is considered as an information system or an information processing device that includes at least a part of the above-described processing or units. The present disclosure is also considered as an information processing method that executes at least a part of the processing performed by the above units. The present disclosure is also considered as a computer readable storage medium that stores therein a computer program for causing a computer to execute this information processing method. The above processing and units may be combined as necessary for implementation as long as there is no technical conflict.

The present disclosure can provide a technique for improving the reliability of collection from and delivery to or from a vehicle parked in a predetermined position.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram showing an example of a configuration of a trunk share system according to an embodiment;

FIG. 2 is a diagram showing an example of a hardware configuration of an in-vehicle device, a requesting-user terminal, a collection/delivery staff terminal, a collection/delivery management server, and a center server;

FIG. 3 is a diagram showing vehicle information notified to a collection/delivery staff terminal;

FIG. 4 is a diagram showing collection/delivery management information;

FIG. 7 is a sequence diagram showing an example of the flow of collection/delivery processing.

DETAILED DESCRIPTION OF EMBODIMENTS

Figure 5:
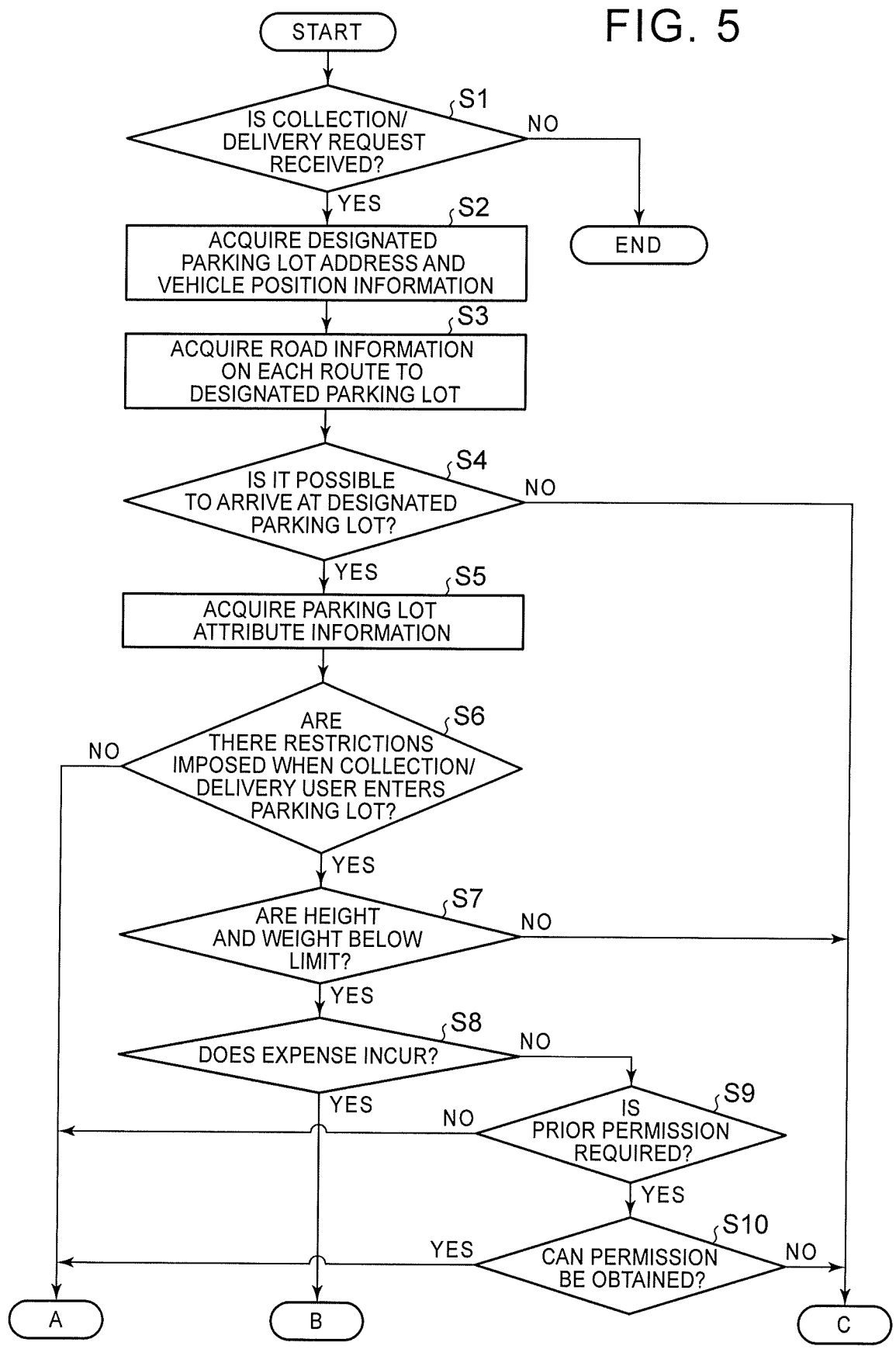
FIG. 5 is a flowchart showing an example of delivery possibility determination processing.

A trunk share system according to one embodiment will be described below with reference to the drawings. The configuration of the embodiment described below is an example, and the trunk share system is not limited to the configuration of the embodiment.

<1. System Configuration>

FIG. 1 is a diagram showing an example of a configuration of a trunk share system 1 according to this embodiment. The trunk share system 1 is a system that provides the collection/delivery service. In this collection/delivery service, the vehicle interior or the baggage room (trunk room) of a vehicle 30 is shared, as the acceptance/delivery position of a collection/delivery item, between a person who requests the collection/delivery work of a collection/delivery item (baggage) and a person who carries out the collection/delivery work of the collection/delivery item. The vehicle 30 used as the acceptance/delivery position of a collection delivery item is a vehicle that can be locked/unlocked using an electronic key. The vehicle 30 is designated by the person who requests the collection/delivery work. In the embodiment described below, sharing the vehicle interior or baggage room of the vehicle 30 is referred to as trunk sharing. Also, the collection/delivery service provided by the trunk share system 1 is called a trunk share service. Furthermore, the trunk share service is also simply referred to as trunk sharing. Not that the trunk share system 1 according to this embodiment may provide a service that allows a plurality of persons to co-own at least a part of the vehicle 30. In the description below, "share" includes at least one of sharing and co-owning. In the trunk share system 1, "a person who requests collection/delivery work" is a user who uses the vehicle interior or baggage room of the vehicle 30 as the delivery destination of a delivery item or the collection destination of a baggage. This user is also referred to as a "requesting user". For example, requesting users include not only the owner or the right holder of the vehicle 30 but also a user who borrows a vehicle, which is lent for use in trunk sharing, and uses the vehicle as the delivery destination or the collection destination. The requesting user has a requesting-user terminal 40. "A person who carries out collection/delivery work" is a business operator who collects or delivers a delivery item or baggage as a collection/delivery item, in which case, a collection/delivery item is delivered to the vehicle interior or the baggage room of the vehicle 30 or baggage is collected from the vehicle interior or the baggage room of the vehicle 30 in which the baggage is stored. This user is also referred to a "collection/delivery user". Collection/delivery users include a delivery company that provides the delivery service for delivering delivery items to a delivery destination and a distribution company that provides the transportation service between the delivery bases of delivery items. A collection/delivery staff is an employee of a collection/delivery user or a person who carries out collection/delivery work on consignment from a collection/distribution user. The collection/delivery staff has a collection/delivery staff terminal 50. The vehicle interior or the baggage room used as the acceptance/delivery position of a collection/delivery item includes an area of the vehicle 30 in which a collection/delivery item can be stored and which can be locked/unlocked, such as a bonnet, a front passenger's seat, and a rear seat. In the description below, the vehicle interior or baggage room is also simply referred to as a "baggage room".

The trunk share system 1 shown in FIG. 1 includes a collection/delivery management server 10, a center server 20, a communication device 32 mounted on the vehicle 30, the requesting-user terminal 40, and the collection/delivery staff terminal 50 that are interconnected by a network N. The network N includes a public network such as the Internet, the wireless network of a cellular phone network, a dedicated network such as a virtual private network (VPN), and a network such as a local area network (LAN). An in-vehicle device 31 mounted on the vehicle 30 is connected to the requesting-user terminal 40 and the collection/delivery staff terminal 50 via short-range wireless communication. To the network N, a plurality of other components (not shown) may be connected, including collection/delivery management servers 10, center servers 20, communication devices 32 of the vehicles 30, requesting-user terminals 40, and collection/delivery staff terminals 50. In addition, to the network N, other servers not shown are connected, including a server operated by an e-commerce dealer that provides net shopping as the business and a server that provides point of interest (POI) information to a car navigation device.

The collection/delivery management server 10 is a computer used by the users each of which functions as a collection/delivery user. These users include a delivery company that provides the delivery service for delivering a delivery item to a delivery destination and a distribution company that provides transportation services between the bases of delivery items. The collection/delivery management server 10 manages the acceptance/delivery of collection/delivery items to and from the requesting users who share the baggage room of the vehicle 30 as the collection/delivery destination. The collection/delivery management server 10 has a collection/delivery management database (DB) 200. The collection/delivery management server 10 provides the information processing functions of at least a delivery request acceptance unit 110, a delivery possibility determination unit 120, and a delivery management unit 130. Note that the collection/delivery management server 10 may be a single computer or a collection of a plurality of computers (for example, a system called a cloud). Similarly, the collection/delivery management DB 200 may be built by a single database server or a plurality of database servers. The collection/delivery management server 10 may be operated, for example, by an e-commerce dealer that provides online shopping as the business. In addition, the collection/delivery management server 10 may be operated by a cooperating organization of delivery companies, distributors, or e-commerce companies. Furthermore, the collection/delivery management server 10 may be operated cooperatively by brokers such as a trading company or an agent that mediates the sale of the vehicle 30, or by rental agents or leasing agents that provide the rental service or the loan service of the vehicle 30.

The collection/delivery management server 10 according to this embodiment accepts a request for collecting/delivering a collection/delivery item, which designates the vehicle 30 as the collection/delivery destination, from the requesting-user terminal 40 of a requesting user. In the requesting-user terminal 40 used by a requesting user, an application program (hereinafter also referred to as "predetermined application") for using the collection/delivery service of the trunk share system 1 has been installed. For example, when requesting the delivery user to deliver an item, purchased at an online shopping site, as a collection/delivery item, the requesting user may use the predetermined application to register the information on the collection/delivery of the collection/delivery item in the collection/delivery management server 10. The collection/delivery management server 10 according to this embodiment accepts the registration of the information on the collection/delivery of the collection/delivery item as a collection/delivery request. At the same time, based on the arrival route information that indicates a route to the parking position of the vehicle 30 designated as the collection/delivery destination, the collection/delivery management server 10 determines whether the collection/delivery item will be collected/delivered, as will be described later. The arrival route information includes, for example, the road information on the road to the parking lot where the vehicle 30 is parked, the parking lot attribute information, and the approach restrictions imposed on the collection/delivery vehicle, which carries the collection/delivery items, when approaching the area where the vehicle 30 is parked. The road information includes the information on regulation due to road construction, the height limitation when traveling on the road, the road width, and so on.

The collection/delivery management server 10 in this embodiment determines the condition of the road to the entrance of the parking lot on the delivery date and the delivery time zone of a collection/delivery item, for example, based on the arrival route information and, then, determines whether the delivery vehicle will be able to deliver the collection/delivery item. In addition, even if it is possible to arrive at the parking lot entrance, the collection/delivery management server 10 determines whether the collection/delivery vehicle will be able to approach the parking position of the vehicle 30 based on various restrictions that depend on the parking lot attribute. For example, the "parking lot attribute" includes the following: configuration forms such as whether the parking lot is a pay parking lot or a free parking lot, whether the parking lot is a flat parking lot or a multilevel parking garage, and whether the parking lot is an indoor lot (the first floor or the underground floor etc. of an apartment) or an outdoor lot (outdoor parking area of an apartment), the necessity of approval when entering the parking lot, and limitation on height or weight when entering the parking lot. Even if it is determined in the above determination that it is difficult to collect from or deliver to the vehicle 30 designated as the collection/delivery destination, the collection/delivery management server 10 identifies another parking lot near to the parking position of the vehicle 30 and notifies the requesting user whether the requesting user approves the use of the identified parking lot or whether the vehicle may be moved to the identified parking lot. In this way, the collection/delivery management server 10 increases the possibility of collection/delivery of a collection/delivery item. If the approval to use another parking lot or the consent to vehicle movement to another parking lot is not obtained from the requesting user, the collection/delivery management server 10 determines that the collection/delivery item cannot be collected or delivered. In this case, the collection/delivery management server 10 notifies the requesting user to enter the instruction information about the next delivery of the collection/delivery item. The collection/delivery management server 10 in this embodiment repeatedly makes the similar determination based on the instruction information about the next delivery of the collection/delivery item that has been determined not to be delivered. As a result, the collection/delivery management server 10 in this embodiment increases the accuracy of determination whether the collection/delivery item can be collected or delivered when a collection/delivery request is accepted, and, at the same time, increases the reliability of collection from or delivery to the vehicle 30 parked in a predetermined position.

When a collection/delivery request is received and it is determined that the collection/delivery item can be collected or delivered, the collection/delivery management server 10 registers the request information in the collection/delivery management DB 200 as the collection/delivery management information. As described below with reference to FIG. 4, at least the collection/delivery information on a collection/delivery item received from the requesting user and the status information indicating whether the collection/delivery of the collection/delivery item is completed are stored in the collection/delivery management information in association with the identification information (vehicle ID) on the vehicle 30.

When a key information issuance request for temporarily locking/unlocking the vehicle 30 is received, for example, from a requesting user or a collection/delivery staff, the collection/delivery management server 10 notifies the center server 20 that the key information issuance request has been received. The collection/delivery management server 10 notifies the center server 20 about the issuance request that includes, for example, the identification information on the vehicle 30 and the information indicating the acceptance/delivery position in the vehicle 30. Based on the information including the identification information on the vehicle 30, the information indicating the acceptance/delivery position (collection/delivery position) in the vehicle 30, and the time information indicating the time when the issuance request was received, the center server 20 issues the key information that causes the requesting-user terminal 40 or the collection/delivery staff terminal 50 to function as a temporary electronic key. The issued key information is sent to the requesting-user terminal 40 or the collection/delivery staff terminal 50, for example, via the collection/delivery management server 10.

The center server 20 is a computer, such as a personal computer (PC), a workstation (WS), or a server, of a management company that manages the key information for locking and unlocking of the vehicle 30. The center server 20 may be a single computer or a system composed of a group of computers such as a cloud. Note that the management company that has the center server 20 is, for example, a department or an associated company of the manufacturer of the vehicle 30 or a business operator that carries out the key information management on consignment from the manufacturer.

The center server 20 cooperates with the collection/delivery management server 10 to manage the key information that locks and unlocks the baggage room of the vehicle 30 that is registered in advance as the acceptance/delivery position of a collection/delivery item. The center server 20 accepts a key information issuance request from the collection/delivery management server 10 operating in cooperation with the center server 20 and, at the same time, issues the key information corresponding to the area in the vehicle 30 designated as the acceptance/delivery position of the collection/delivery item. The "key information" is the authentication information required when using the vehicle 30 that can be locked/unlocked using an electronic key. The vehicle-side authentication information is registered in the in-vehicle device 31 mounted on the vehicle 30. The center server 20 manages the vehicle-side authentication information in association with the identification information on the vehicle 30 on which the in-vehicle device 31 is mounted.

Upon receipt of the key information issuance request from the collection/delivery management server 10, the center server 20 issues the authentication information, used to temporarily lock/unlock the vehicle 30, as the key information (one-time key) based on the vehicle-side authentication information associated with the vehicle 30. The issued one-time key is sent via the network N to the requesting-user terminal 40 or the collection/delivery staff terminal 50 that issued the issuance request. If the one-time key, delivered to the requesting-user terminal 40 or the collection/delivery staff terminal 50, is used to successfully authenticate on the in-vehicle device 31, the requesting user or the collection/delivery staff can lock/unlock the baggage room of the vehicle 30 via the in-vehicle device 31.

The communication device 32 mounted on the vehicle 30 is a wireless communication device connectable to the network N. The communication device 32 is connected to an in-vehicle network such as a controller area network (CAN) in the vehicle 30. The communication device 32 works, for example, with a car navigation device and a global positioning system (GPS) unit (both not shown), which are mounted on the vehicle 30, to acquires various types of information such as the congestion information, road conditions, weather information, and news information that are related to the current position of the vehicle 30. In this embodiment, the communication device 32 acquires the position information (latitude and longitude) on the host vehicle in response to a request from the center server 20 connected to the network N and notifies the center server 20 about the acquired position information. The communication device 32, which has received the position information notification request, acquires the position information (latitude/longitude) on the parking position, where the host vehicle is parked, from the GPS unit mounted on the vehicle 30 and then responds to the center server 20 with the acquired position information. For example, the collection/delivery management server 10 acquires the parking position information (latitude/longitude) on the position, where the vehicle 30 is parked, via the center server 20. Based on the acquired position information, the collection/delivery management server 10 can determine whether a collection/delivery item can be delivered.

<2. Hardware Configuration>

FIG. 2 is a diagram showing an example of a hardware configuration of each of the components (collection/delivery management server 10, center server 20, in-vehicle device 31, requesting-user terminal 40, and collection/delivery staff terminal 50) that configure the trunk share system 1. In this embodiment, the in-vehicle device 31 includes a key unit 80 and a locking/unlocking device 90. The key unit 80, with a wireless interface similar to that of an electronic key (hereinafter referred to as a mobile device) that is called a smart key, communicates with the existing locking/unlocking device 90 configuring the in-vehicle device 31. A requesting user, who uses the baggage room of the vehicle 30 as the collection/delivery destination of an item, has the authentication information, held in the requesting-user terminal 40, authenticated by the authentication of the key unit 80. By doing so, the requesting user can lock/unlock the baggage room or the vehicle interior of the vehicle 30 without using a physical key. That is, the key unit 80 carries out short-range wireless communication with the requesting-user terminal 40 or the collection/delivery staff terminal 50 (in the description below, "the requesting-user terminal 40 or the collection/delivery staff terminal 50" is collectively referred to as the requesting-user terminal 40 or the like) that holds the authentication information therein and, based on the result of the authentication of the requesting-user terminal 40 or the like, determines whether the key unit 80 will behave as the electronic key of the vehicle 30.

For example, when accessing the baggage room of the vehicle 30 for the delivery/collection of a collection/delivery item, the requesting-user terminal 40 or the like has the authentication information for locking/unlocking the baggage room issued by the center server 20 via the collection/delivery management server 10 as described above. The authentication information, sent from the requesting-user terminal 40 or the like to the key unit 80, is verified against the vehicle-side authentication information stored in advance in the key unit 80. If the authentication is successful, the requesting-user terminal 40 or the like is authenticated as a terminal that authentically activates the in-vehicle device 31. If the requesting-user terminal 40 or the like is authenticated, the key unit 80 sends the key ID of the vehicle 30, stored in advance in the key unit 80 and associated with the vehicle-side authentication information, together with the locking/unlocking signal, to the locking/unlocking device 90. If the key ID received from the key unit 80 matches the key ID stored in advance in the locking/unlocking device 90, the locking/unlocking device 90 locks/unlocks the vehicle 30. Note that the key ID stored in advance in the key unit 80 may be encrypted by the vehicle-side authentication information. In this case, if the authentication of the requesting-user terminal 40 is successful, the key unit 80 is only required to decrypt the key ID with the vehicle-side authentication information and then to send the decrypted key ID to the locking/unlocking device 90. The key unit 80 and the locking/unlocking device 90 operate on power supplied from a battery mounted on the vehicle 30. Note that the key unit 80 and the locking/unlocking device 90 may operate not only on electric power supplied from the battery mounted on the vehicle 30 but also on electric power supplied from a commercially available battery.

The locking/unlocking device 90, a device for locking and unlocking the doors of the vehicle interior and baggage room of the vehicle 30, is an existing device constituting a part of the smart key system. The locking/unlocking device 90 locks and unlocks the door of the vehicle 30 in response to the locking signal and the unlocking signal sent from the mobile device corresponding to the vehicle 30 via radio waves in the radio frequency (hereinafter referred to as RF) band. The locking/unlocking device 90 also has a function to send radio waves in a low frequency (hereinafter referred to as LF) band used for searching for the mobile device.

In this embodiment, on behalf of the mobile device described above, the key unit 80 sends and receives radio waves in the RF band and the LF band to and from the locking/unlocking device 90 to lock/unlock the door 30 of the vehicle 30. In the description below, the communication destination of the locking/unlocking device 90 is limited to the key unit 80 unless otherwise noted.

The locking/unlocking device 90 includes an LF transmitter 91, an RF receiver 92, a verification ECU 93, a body ECU 94, and a door lock actuator 95. The LF transmitter 91 is a unit for sending radio waves in a low frequency band (for example, 100 KHz to 300 KHz) for searching for (polling) the key unit 80. The LF transmitter 91 is built in, for example, near to the center console or the steering wheel in the vehicle interior. The RF receiver 92 is a unit for receiving radio waves in a high frequency band (for example, 100 MHz to 1 GHz) sent from the key unit 80. The RF receiver 92 is built in any position within the vehicle interior.

The verification ECU 93 is a computer that controls the locking and unlocking of the doors of the vehicle interior and the baggage room of the vehicle 30 based on the signal (locking signal or unlocking signal) sent from the key unit 80 via radio waves in the RF band. The verification ECU 93 is configured, for example, by a microcomputer. In the description below, the locking signal and the unlocking signal are also referred to as the locking/unlocking signal. The term locking/unlocking signal is a generic term and represents at least one of the locking signal and the unlocking signal.

The verification ECU 93 authenticates that the locking/unlocking signal, sent from the key unit 80, is sent from an authentic device. More specifically, the verification ECU 93 determines whether the key ID, included in the locking/unlocking signal, matches the key ID stored in advance in the storage unit of the verification ECU 93. Based on the result of this determination, the verification ECU 93 sends the unlock command or the lock command to the body ECU 94. This unlock command or the lock command is sent via an in-vehicle network such as CAN.

The body ECU 94 is a computer that carries out the body control of the vehicle 30. The body ECU 94 controls the door lock actuator 95 based on the unlock command or the lock command received from the verification ECU 93, thereby unlocking and locking the vehicle interior door and the baggage room door of the vehicle 30 at the same time or independently. After unlocking the vehicle interior door, the bonnet of the vehicle 30 is accessed through the operation of a predetermined part provided near to the driver's seat. The verification ECU 93 and the body ECU 94 may be integrated.

The door lock actuator 95 is an actuator for locking and unlocking the doors of the vehicle 30, including the doors for getting in and out of the vehicle, the rear gate, and the baggage room door that is opened or closed when loading/unloading baggage to or from the baggage room. The door lock actuator 95 operates based on the signal sent from the body ECU 94. The door lock actuator 95 may be configured to be able to lock and unlock the doors for getting in or out of the vehicle and rear gate of the vehicle 30 independently of the baggage room door of the vehicle 30.

Next, the key unit 80 will be described. The key unit 80 is a device arranged in a predetermined position (for example, in a glove box) in the vehicle interior of the vehicle 30. The key unit 80 has the following two functions: one is the function to authenticate the requesting-user terminal 40 or the like through short-range wireless communication with the requesting-user terminal 40 or the like and the other is the function to send the locking/unlocking signal using radio waves in the RF band based on the authentication result. The key unit 80 includes an LF receiver 81, an RF transmitter 82, a short-range communication unit 83, and a control unit 84.

The LF receiver 81 is a unit for receiving the polling signal sent from the locking/unlocking device 90 via radio waves in the LF band. The LF receiver 81 has an antenna (hereinafter referred to as LF antenna) for receiving radio waves in the LF band. The RF transmitter 82 is a unit for sending the locking/unlocking signal to the locking/unlocking device 90 via radio waves in the RF band.

The short-range communication unit 83 is unit for communicating with the requesting-user terminal 40 or the like. The short-range communication unit 83 carries out communication at a short distance (to the extent that communication can be carried out between the inside and the outside of the vehicle interior) according to a predetermined wireless communication standard.

In this embodiment, the short-range communication unit 83 carries out data communication according to the Bluetooth (registered trademark) low energy standard (hereinafter referred to as BLE). BLE, a low power communication standard based on Bluetooth, is characterized in that communication can be started immediately by detecting a partner with no need for pairing between the devices. Although BLE is exemplified in this embodiment, other wireless communication standards may also be used. For example, near field communication (NFC), ultra wideband (UWB), WiFi (registered trademark) and so on may be used.

The control unit 84 is a computer that controls the authentication of the requesting-user terminal 40 or the like through short-range wireless communication with the requesting-user terminal 40 or the like via the short-range communication unit 83 and, in addition, controls the transmission of the locking/unlocking signal generated based on the result of the authentication. The control unit 84 is configured, for example, by a microcomputer.

The control unit 84 includes a storage unit 84a and an authentication unit 84b. The storage unit 84a stores therein the control program for controlling the key unit 80. The control unit 84 may cause the central processing unit (CPU) (not shown) to execute the control program, stored in the storage unit 84a, to implement various functions including the function of the authentication unit 84b. The control unit 84 has the following function: the function to receive the polling signal sent from the locking/unlocking device 90 as radio waves in the LF band via the LF receiver 81, the function to send the locking/unlocking signal to the locking/unlocking device 90 as radio waves in the RF band via the RF transmitter 82, the function to process communication with the requesting-user terminal 40 or the like performed via the short-range communication unit 83, and the function to generate the locking/unlocking signal when the requesting-user terminal 40 or the like has been successfully authenticated by the authentication unit 84b.

The authentication unit 84b authenticates the requesting-user terminal 40 or the like based on the authentication information included in the locking request or the unlocking request (hereinafter generically referred to as a locking/unlocking request) sent from the requesting-user terminal 40 or the like. More specifically, the authentication unit 84b compares the vehicle-side authentication information, stored in the storage unit 84a, with the authentication information sent from the requesting-user terminal 40 or the like and, if they satisfy the predetermined relationship, determines that the authentication is successful. If the vehicle-side authentication information and the authentication information sent from the requesting-user terminal 40 or the like do not satisfy the predetermined relationship, the authentication unit 84b determines that the authentication has failed. The predetermined relationship is any of the following cases: the vehicle-side authentication information, stored in the storage unit 84a, matches the authentication information sent from the requesting-user terminal 40 or the like, the processing results of predetermined encryption and decryption using the two pieces of authentication information match (one is the vehicle-side authentication information and the other is the authentication information sent from the requesting-user terminal 40 or the like), and the result of decryption processing of one of the two pieces of authentication information matches the other authentication information.

If the authentication unit 84b succeeds in the authentication of the requesting-user terminal 40 or the like, the locking/unlocking signal, generated according to the request received from the requesting-user terminal 40 or the like, is sent to the locking/unlocking device 90 via the RF transmitter 82. The authentication method performed by the authentication unit 84b may be a method in which the two pieces of authentication information are simply compared to verify that they are the same as described above or a method in which asymmetric encryption is used. In the description below, the vehicle-side authentication information stored in the key unit 80 may be referred to as the device authentication information, and the authentication information sent from the requesting-user terminal 40 as the terminal authentication information, as necessary. The key unit 80 sends the key ID described above, together with the locking/unlocking signal, to the locking/unlocking device 90.

The collection/delivery management server 10 is configured as a typical computer. The collection/delivery management server 10 has a CPU 11, a main storage device 12, an auxiliary storage device 13, a communication interface (IF) 14, and an input/output IF 15. These components are interconnected by a connection bus 16. The main storage device 12 and the auxiliary storage device 13 are computer readable recording media. A plurality of units may be provided for each of the components described above, or some components may not be provided.

The CPU 11 is a central processing unit that controls the entire computer. The CPU 11 is also called a microprocessor unit (MPU) or a processor. The configuration of the CPU 11 is not limited to a single-processor configuration, but may be a multiprocessor configuration. In addition, a single CPU connected by a single socket may have a multi-core configuration. For example, the CPU 11 expands a program, stored in the auxiliary storage device 13, into the work area of the main storage device 12 in the executable form and then, through the execution of the program, controls the peripheral devices for providing the function that meets the predetermined purpose.

The main storage device 12 stores computer programs to be executed by the CPU 11 and data to be processed by the CPU 11. The main storage device 12 includes, for example, a flash memory, a random access memory (RAM), and a read only memory (ROM). The auxiliary storage device 13 stores various programs and various data in a recording medium in such a way that programs and data may be read from or written to the recording medium. The auxiliary storage device 13 is, for example, a flash memory, an erasable programmable ROM (EPROM), a silicon disk, and a hard disk drive (HDD, Hard Disk Drive). The auxiliary storage device 13 includes a portable recording medium such as a universal serial bus (USB) memory and a disk recording medium such as a compact disc (CD) or a digital versatile disc (DVD). The auxiliary storage device 13 stores, for example, an operating system (OS), various programs, and various tables. The OS includes, for example, a communication interface program that exchanges data with another information processing device connected to the network N via the communication IF 14.

The communication IF 14 is a communication interface with the network N. For example, as the communication IF 14, a LAN interface board or a wireless communication circuit for wireless communication is used. The input/output IF 15 is an interface for inputting/outputting data to or from a device connected to the computer. To the input/output IF 15, input devices are connected; for example, a keyboard, a pointing device such as a touch panel and a mouse, and an input device such as a microphone are connected. An operation instruction from an operator, who operates the input device, is accepted via this input/output IF 15. In addition, to the input/output IF 15, output devices are connected; for example, a display device, such as a liquid crystal display (LCD), an electroluminescence (EL) panel, or an organic EL panel, and a speaker are connected. Data and information processed by the CPU 11, or stored in the main storage device 12 or the auxiliary storage device 13, is input or output via the input/output IF 15.

The collection/delivery management server 10 causes the CPU 11 to execute programs to provide at least the following information processing functions: delivery request acceptance unit 110, delivery possibility determination unit 120, and delivery management unit 130. Note that at least a part of the processing functions described above may be provided by a digital signal processor (DSP), an application specific integrated circuit (ASIC), or a graphics processing unit (GPU). In addition, at least a part of the processing functions described above may be provided by a dedicated largescale integration (LSI) such as a field-programmable gate array (FPGA), a numerical operation processor, or an image processing processor or by another digital circuit.

The delivery request acceptance unit 110 accepts collection/delivery request information received via the requesting-user terminal 40. The accepted collection/delivery request information is temporarily stored in a predetermined area of the main storage device 12 in association with identification information (telephone number, IP address, MAC address, etc.) of the requesting-user terminal 40. The delivery request acceptance unit 110 delivers the accepted collection/delivery request information to the delivery possibility determination unit 120.

The delivery possibility determination unit 120 determines whether collection/delivery can be carried out based on the parking lot address and the parking position included in the collection/delivery request information and based on the arrival route information indicating a route by which the collection/delivery vehicle will arrive at the parking position in the collection/delivery time zone on the requested collection/delivery date. For example, the delivery possibility determination unit 120 determines whether collection/delivery can be carried out based on the information on the road to the parking lot where the vehicle 30 is parked and based on the approach restrictions imposed on the collection/delivery vehicle according to the parking lot attribute when the collection/delivery vehicle carrying the collection/delivery item approaches the parking position. The result of the determination of whether collection/delivery can be carried out is notified to the requesting user. If it is determined that collection/delivery can be carried out, the delivery management unit 130 registers the collection/delivery request information in the collection/delivery management DB 200 as the delivery management information and manages the collection/delivery status of each vehicle. The detailed processing of the delivery request acceptance unit 110, delivery possibility determination unit 120, and delivery management unit 130 will be described later with reference to FIG. 5 and FIG. 6.

Like the collection/delivery management server 10, the center server 20 includes a CPU 21, a main storage device 22, an auxiliary storage device 23, a communication IF 24, and an input/output IF 25 that are interconnected by a connection bus 26. The configuration of each of the CPU 21, main storage device 22, auxiliary storage device 23, communication IF 24, and input/output IF 25 is similar to that of the CPU 11, main storage device 12, auxiliary storage device 13, communication IF 14, and input/output IF 15 of the collection/delivery management server 10 and, therefore, the description will be omitted.

The center server 20 has a vehicle management database (not shown) built in the auxiliary storage device 23. In this database, the key information is stored. This key information is associated with the vehicle identification information on the vehicle 30 that is used as the collection/delivery destination of a collection/delivery item. The vehicle identification information includes the following: identification information (address, name, contact address) uniquely identifying the owner of the vehicle, and type, manufacturing year, displacement, vehicle type, color, manufacturing number, insurance number, and car registration number (car number) of the vehicle 30. The vehicle identification information also includes the information identifying the parking position of the vehicle 30 and the identification information on the communication device 32 mounted on the vehicle 30. The information identifying the parking position of the vehicle 30 includes the address information (parking lot address) indicating the location of the parking lot where the vehicle 30 is parked and the information (latitude/longitude) indicating the parking position in the parking lot. The information indicating the parking position is obtained, for example, from the communication device 32 mounted on the vehicle 30 or the car navigation device having the communication function. The identification information on the communication device 32 includes the IP address and the media access control address (MAC) of the communication device 32.

The requesting-user terminal 40 and the collection/delivery staff terminal 50 are each a compact computer such as a smartphone, a mobile phone, a tablet terminal, a personal information terminal, or a wearable computer (smart watch, etc.). The requesting-user terminal 40 may be a PC connected to the collection/delivery management server 10 via the network N.

The requesting-user terminal 40 includes a CPU 41, a main storage device 42, an auxiliary storage device 43, a communication IF 44a, a short-range communication IF 44b, and an input/output IF 45 interconnected by a connection bus 46. The configuration of each the CPU 41, main storage device 42, auxiliary storage device 43, and input/output IF 45 is similar to that of the CPU 11, main storage device 12, auxiliary storage device 13, and input/output IF 15 of the collection/delivery management server 10 and, therefore, the description is omitted. The communication IF 44a is a communication circuit for accessing a public network, such as the Internet, through the wireless network of the cellular phone network for carrying out data communication with the collection/delivery management server 10 and so on. The short-range communication IF 44b is a communication circuit for carrying out short-range communication according to a predetermined communication standard. The predetermined communication standard is, for example, BLE, NFC, and UWB. Note that the input/output IF 45 may include an input device such as a pushbutton, and may include an input device for receiving videos or images captured by a camera or other apparatuses.

The requesting-user terminal 40 is connected to a server, operated, for example, by an e-commerce dealer or the like that provides net shopping as the business, through execution of a browser program on the CPU 41. In response to an operation input from the requesting user, the requesting-user terminal 40 can designate the information on the vehicle 30, sharable with the collection/delivery user, as the delivery destination of a purchased item. In addition, the requesting-user terminal 40 is connected to the collection/delivery management server 10 through execution of the predetermined application on the CPU 41. In response to an operation input from the requesting user, the requesting-user terminal 40 makes a collection/delivery request for a collection/delivery item that designates a predetermined area in the vehicle 30 as the collection/delivery destination.

Like the requesting-user terminal 40, the collection/delivery staff terminal 50 includes a CPU 51, a main storage device 52, an auxiliary storage device 53, a communication IF 54a, a short-range communication IF 54b, and an input/output IF 55 interconnected by a connection bus 56. The configuration of each of the above components is similar to that of the CPU 41, main storage device 42, auxiliary storage device 43, communication IF 44a, short-range communication IF 44b, and input/output IF 45 of the requesting-user terminal 4 and, therefore, the description is omitted.

The collection/delivery staff terminal 50 is connected to the collection/delivery management server 10 through execution of the predetermined application on the CPU 51. In response to an operation input from the collection/delivery staff, the collection/delivery staff terminal 50 notifies the collection/delivery staff about the information on the vehicle 30 that can be used as the acceptance/delivery position of the collection/delivery item. On the display device such as the LCD of the collection/delivery staff terminal 50, the information on the vehicle 30, registered in the collection/delivery management information as the collection/delivery destination of the collection/delivery item, is displayed as the contents coded in HyperText Markup Language (HTML) or the like.

FIG. 3 is a diagram showing the information on the vehicle 30 notified to the collection/delivery staff terminal 50. FIG. 3 shows an example of the information on the vehicle 30 in the tabular form. As shown in FIG. 3, the table is configured to include the following fields of the information on the vehicle 30: vehicle manufacturer, vehicle type, number, parking lot address, vehicle position, color, collection/delivery position, collection/delivery date and time, collection/delivery classification, and restrictions. The identification number is the identification information given to the vehicle 30. The vehicle manufacturer is the information indicating the manufacturer that manufactured the vehicle. The vehicle type is the information indicating the type of the vehicle, such as a sedan or a minivan. The number is the car registration number on the license plate attached to the front and rear of the vehicle. The parking lot address is the address information indicating the location of the parking lot where the vehicle is parked. The vehicle position is the information indicating the parking position in the parking lot. For example, the latitude/longitude of the position where the vehicle is parked is indicated as the vehicle position. The color is the information indicating the color of the vehicle. Instead of the color, the image information showing the vehicle may be presented. The collection/delivery position is the information indicating an area in the vehicle 30 used as the collection/delivery destination. Examples of the collection/delivery position include, for example, the bonnet, the passenger seat, the passenger-seat-side rear seat, the driver-seat-side rear seat, and the baggage room. The collection/delivery date and time is the information indicating the date and time and the time zone on which the collection/delivery work will be carried out for the vehicle 30. The collection/delivery classification is the classification indicating which will be carried out, collection or delivery, during the collection/delivery work. The bonnet, passenger seat, passenger-seat-side rear seat, driver's-seat-side rear seat, and baggage room correspond to "one or more areas in the vehicle that can be used as the collection/delivery destination of a collection/delivery item". The restrictions indicate various conditions that are imposed when the determination whether a collection/delivery item can be delivered (which will be will be described later) indicates that the collection/delivery item can be delivered with some conditions. Detailed contents of the restrictions will be described later with reference to FIG. 6. Note that the data on the restrictions may also be described in another table that is pointed to by a pointer.

(Collection/delivery management DB) As shown in FIG. 1, the collection/delivery management DB 200 of the collection/delivery management server 10 stores at least the collection/delivery management information and the collection/delivery staff management information.

The collection/delivery management information is the information for managing the collection/delivery status of each vehicle used as the collection/delivery destination of a collection/delivery item. FIG. 4 is a diagram showing the collection/delivery management information. FIG. 4 shows an example of the collection/delivery management information in a tabular form stored in the collection/delivery management DB 200. As shown in FIG. 4, the collection/delivery management information includes the following fields: vehicle ID, collection/delivery date/time, collection/delivery classification, collection/delivery status, baggage attribute, user ID, user terminal, collection/delivery position, parking lot address, vehicle position, and restrictions. The vehicle ID is the identification information for identifying the vehicle 30. The identification information on the vehicle 30 is associated, for example, with the vehicle identification information on the vehicle 30 managed by the center server 20. The collection/delivery date/time is the information indicating the collection/delivery date and collection/delivery time zone on which collection/delivery from or to the vehicle 30 is reserved. The collection/delivery classification is the information indicating the classification of collection/delivery. The collection/delivery status is the information indicating the completion/incompletion status of reserved collection/delivery, and the user ID is the identification information for identifying the requesting user. The user terminal is the identification information on the requesting-user terminal 40, and the collection/delivery position is the information indicating an area in the vehicle designated as the collection/delivery destination of the collection/delivery item. The parking lot address is the address information indicating the location of the parking lot where the vehicle 30 is parked, and the vehicle position is the information indicating the parking position in the parking lot. For example, as the vehicle position, the latitude/longitude of the parking position, acquired via the communication device 32, is stored. The restrictions indicate various conditions that are imposed when the determination whether a collection/delivery item can be delivered (which will be will be described later) indicates that the collection/delivery item can be delivered with some conditions. In the example in FIG. 4, the collection/delivery vehicle cannot enter the designated parking lot and the use of a pay parking lot near to the designated parking lot is indicated. Note that, when reserved collection/delivery is completed, the collection/delivery management information may include the identification information on the collection/delivery staff terminal 50 to which the key information was issued as well as the completion time of the collection/delivery work.

The collection/delivery staff management information is the information for managing the employees of a collection/delivery user or collection/delivery staffs for carrying out collection/delivery work on consignment from a collection/delivery user. The collection/delivery staff management information includes the following: identification information uniquely identifying a collection/delivery staff, name, contact address other than the collection/delivery staff terminal 50, and identification information on the collection/delivery staff terminal 50 used by the collection/delivery staff. The identification information on the collection/delivery staff terminal 50 includes, for example, the telephone number, IP address, mail address, and MAC address of the collection/delivery staff terminal 50. The collection/delivery staff management information is registered by the collection/delivery management server 10 or by a computer that cooperates with the collection/delivery management server 10. When a collection/delivery staff carries out collection/delivery work on consignment from a collection/delivery user, the information identifying the vehicle used for collection/delivery work may be stored.

<3. Processing Flow>

Figure 6:
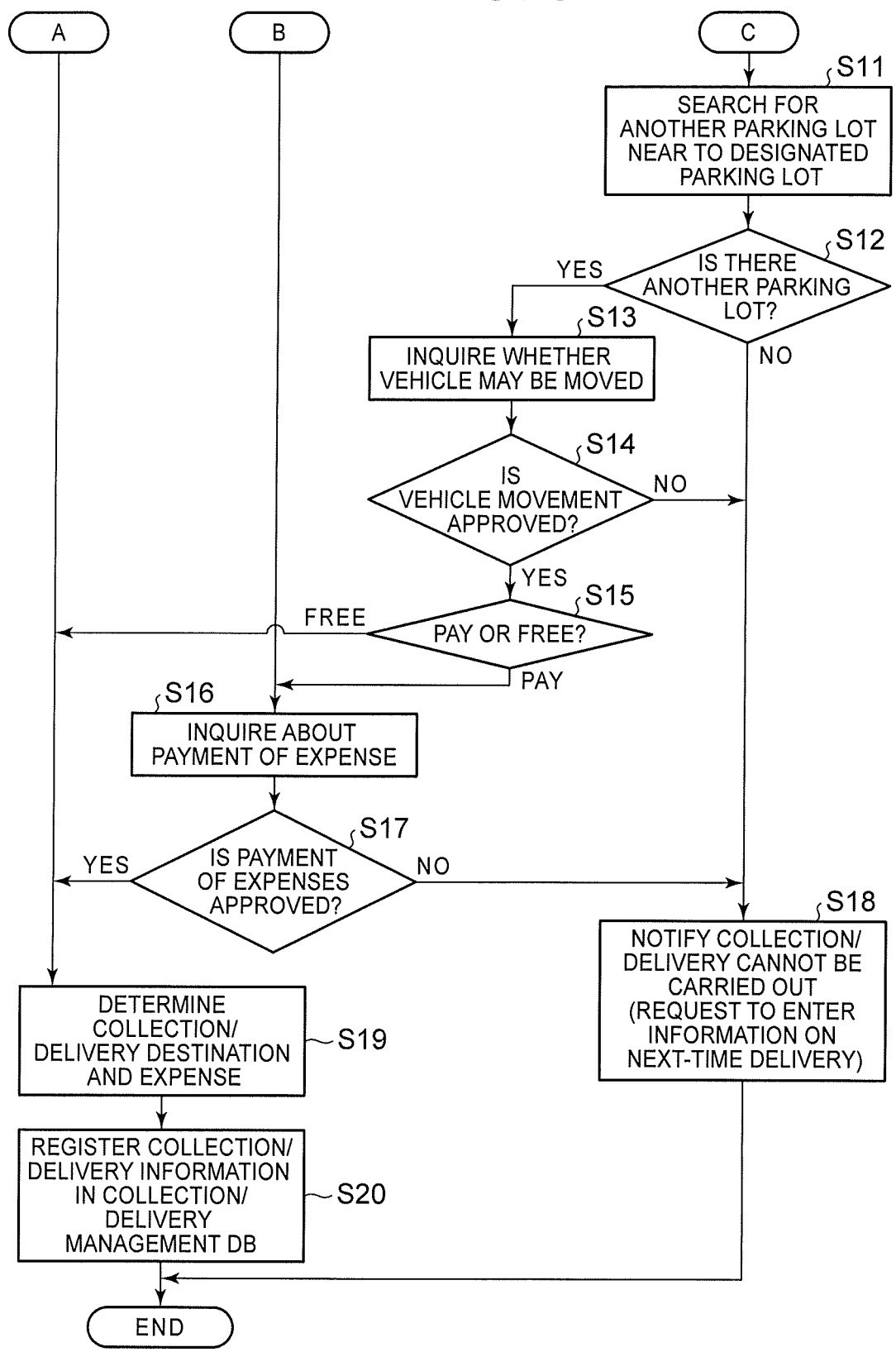
FIG. 6 is a flowchart showing an example of delivery possibility determination processing.

Next, the collection/delivery possibility determination processing performed by the collection/delivery management server 10 according to this embodiment will be described. This processing is performed based on the arrival route information that indicates a route to the parking position of the vehicle 30 designated as the collection/delivery destination. FIG. 5 and FIG. 6 are flowcharts showing an example of the delivery possibility determination processing in consideration of a route to arrive at the parking position. The collection/delivery management server 10 causes CPU 11 to read and execute various programs and various data, stored in the auxiliary storage device 13, to provide the processing shown in FIG. 5 and FIG. 6. The processing shown in FIG. 5 and FIG. 6 is provided by the information processing functions of the delivery request acceptance unit 110, the delivery possibility determination unit 120, and the delivery management unit 130.

In the flowchart of FIG. 5, the processing is started when the requesting-user terminal 40 connects to the collection/delivery management server 10 via the network N. The collection/delivery management server 10 receives the information from the requesting-user terminal 40 that has been connected and, at the same time, determines whether the accepted information includes a collection/delivery request (S1). That the information includes a collection/delivery request is specified by a command of the predetermined application installed in the requesting-user terminal 40. Note that the collection/delivery management server 10 may also determine whether the information received from the requesting-user terminal 40 includes the information related to the collection/delivery of a collection/delivery item that will be carried out via the predetermined application. The information related to the collection/delivery of a collection/delivery item includes at least the information identifying the vehicle 30 used as the collection/delivery destination, collection/delivery item, collection/delivery position, collection/delivery date, collection/delivery time zone, parking lot address, vehicle position, and parking lot attribute information. If the information received from the requesting-user terminal 40 is not a collection/delivery request (S1, "No"), the collection/delivery management server 10 terminates the processing shown FIG. 5. Then, the collection/delivery management server 10 executes other processing corresponding to the received information. The processing in S1 executed by the collection/delivery management server 10 of the trunk share system 1 corresponds to an example of a unit for accepting a request for the collection/delivery of a collection/delivery item to or from one or more areas.

If the information received from the requesting-user terminal 40 includes a collection/delivery request (S1, "Yes"), the processing of the collection/delivery management server 10 proceeds to the processing in S2. In the processing in S2, the collection/delivery management server 10 associates the information on the collection/delivery of the collection/delivery item, accepted in the processing in S1, with the time information and temporarily stores the associated information in a predetermined area in the main storage device 12. In addition, the collection/delivery management server 10 acquires the parking lot address (address of the designated parking lot) and the vehicle position information included in the above information. The collection/delivery management server 10 may request the cooperating center server 20 to search for the corresponding vehicle 30, for example, based on the number information included in the information identifying the vehicle 30. The center server 20 searches the vehicle management database, for example, based on the number information to extract the vehicle identification information associated with the vehicle 30. Then, from the extracted vehicle identification information on the vehicle 30, the center server 20 may identify the latitude/longitude information indicating the parking lot address, as well as the parking position in the parking lot, of the vehicle 30 as the vehicle position information and notify the collection/delivery management server 10 of the identified information.

In the processing of S3, the collection/delivery management server 10 acquires the road information on a plurality of routes from a predetermined collection/delivery base to the designated parking lot, based on the information acquired in the processing in S1 and S2. For example, the collection/delivery management server 10 connects to a server that provides the map information and the POI information, and acquires the road information (including traveling regulations such as the road width, height limitations, school zone, etc.) on a plurality of routes leading to the designated parking lot as well as the regulation information such as the construction regulations on the collection/delivery date and the collection/delivery time zone. Then, the collection/delivery management server 10 determines whether it is possible to arriving at the designated parking lot (parking lot entrance) based on the acquired road information (S4). The processing in S2-S3, which is executed by the collection/delivery management server 10 of the trunk share system 1, corresponds to an example of a unit that acquires the parking position information on the vehicle, designated as the collection/delivery destination of the collection/delivery item, and the attribute information on the parking lot in which the vehicle is parked.

Based on the acquired road information and on the vehicle width and the vehicle height of the collection/delivery vehicle (for example, 2-ton truck) used for collection/delivery, the collection/delivery management server 10 determines whether it is possible to travel on each route to the designated parking lot. In addition, based on the regulation information on the designated collection/delivery date and collection/delivery time zone, the collection/delivery management server 10 determines whether it is possible to travel on each route to the designated parking lot. If a route leading to the designated parking lot cannot be used due to construction regulations or if the road width or height is not sufficient for the traveling of the collection/delivery vehicle, the collection/delivery management server 10 determines that the collection/delivery vehicle cannot travel on the route. The collection/delivery management server 10 determines that the collection/delivery vehicle will be able to arrive at the designated parking lot if the collection/delivery vehicle can travel on at least one route.

If it is determined based on the acquired road information that the collection/delivery vehicle will be able to arrive at the designated parking lot (parking lot entrance) (S4, "Yes"), the processing of the collection/delivery management server 10 proceeds to the processing in S5. On the other hand, if it is determined based on the acquired road information that the collection/delivery vehicle will not be able to arrive at the designated parking lot (parking lot entrance) (S4, "No"), the processing of the collection/delivery management server 10 proceeds to the processing in S11 in FIG. 6. The collection/delivery management server 10 may associate the route information, which indicates that the collection/delivery will be able to arrive at the designated parking lot, with the information on the collection/delivery of the collection/delivery item and then temporarily stores the associated information in a predetermined area in the main storage device 12. If it is determined that collection/delivery is possible as a result of the processing in FIG. 5 and FIG. 6, the collection/delivery management server 10 may provide the information on the route described above to the navigation device mounted on the collection/delivery vehicle.

In the processing in S5, the collection/delivery management server 10 acquires the attribute information on the parking lot, in which the vehicle 30 is parked, from the information on the collection/delivery of the collection/delivery item. Note that the collection/delivery management server 10 may connect to a server that provides the map information and the POI information, identifies the POI information associated with the address of the designated parking lot and with the vehicle position (latitude, longitude), and acquire the attribute information on the corresponding parking lot.

The collection/delivery management server 10 determines whether there are restrictions imposed when the collection/delivery user (collection/delivery vehicle) enters the parking lot, based on the parking lot attribute information acquired in the processing in S5 (S6). If there are no restrictions on entry to the parking lot (S6, "No"), the processing of the collection/delivery management server 10 proceeds to the processing in S19 in FIG. 6. There are no restrictions on entry to the parking lot, for example, when the designated parking lot is a free, flat, outdoor parking lot and, in addition, there are no restrictions on entry to the parking lot. On the other hand, if there are restrictions on entry to the parking lot (S6, "Yes"), the processing of the collection/delivery management server 10 proceeds to the processing in S7.

In the processing in S7, it is determined whether the restrictions on entry to the designated parking lot are physical limitations (conditions) such as the height and weight of the entering vehicle. If the height and the total weight of the collection/delivery vehicle satisfy the above condition (when they are below the limit) (S7, "Yes"), the processing of the collection/delivery management server 10 proceeds to the processing in S8. On the other hand, if the height and the total weight of the collection/delivery vehicle do not satisfy the above condition (S7, "No"), the processing of the collection/delivery management server 10 proceeds to the processing in S11 in FIG. 6.

In the processing in S8, it is determined whether an expense (predetermined fee) will incur when the collection/delivery vehicle enters the designated parking lot. For example, if the designated parking lot is a pay parking lot, the collection/delivery management server 10 determines that an expense will incur when entering the designated parking lot; if the designated parking lot is not a pay parking lot, the collection/delivery management server 10 determines that an expense will not incur when entering the designated parking lot. If an expense will incur when entering the designated parking lot (S8, "Yes"), the processing of the collection/delivery management server 10 proceeds to the processing in S16 in FIG. 6. On the other hand, if an expense will not incur when entering the designated parking lot (S8, "No"), the processing of the collection/delivery management server 10 proceeds to the processing in to S9.

In the processing in S9, it is determined whether entry to the designated parking lot requires prior permission by the requesting user, the parking lot administrator, or the like. The parking lot administrators include a company that manages the real estate and an individual who possesses the real estate. If prior permission is required to enter the designated parking lot (S9, "Yes"), the processing of the collection/delivery management server 10 proceeds to the processing in S10. On the other hand, if prior permission is not required to enter the designated parking lot (S9, "No"), the processing of the collection/delivery management server 10 proceeds to the processing in S19 in FIG. 6. In the processing in S10, it is determined whether permission to enter the designated parking lot can be obtained. For example, if the parking lot administrator does not approve the entry of the collection/delivery vehicle into the designated parking lot, it is determined that permission cannot be obtained. If it is determined that permission to enter the designated parking lot can be obtained (S10, "Yes"), the processing of the collection/delivery management server 10 proceeds to the processing in S19 in FIG. 6. On the other hand, if it is determined that permission to enter the designated parking lot cannot be obtained (S10, "No"), the processing of the collection/delivery management server 10 proceeds to the processing in S11 in FIG. 6.

Next, the flowchart in FIG. 6 will be described. In the processing in S11, the collection/delivery management server 10 searches for another parking lot near to the designated parking lot. The collection/delivery management server 10 searches for another parking lot near to the designated parking lot, for example, via a server that provides the map information or the POI information to a car navigation device or the like used in the collection/delivery work. In the processing in S11, the collection/delivery management server 10 searches for another parking lot at which the collection/delivery vehicle will be able to arrive on the designated collection/delivery date and the collection/delivery time zone. The collection/delivery management server 10 determines whether there is another parking lot near to the designated parking lot based on the result of the processing in S11 (S12). If there is another parking lot near to the designated parking lot (S12, "Yes"), the processing of the collection/delivery management server 10 proceeds to the processing in S13. On the other hand, if there is no other parking lot near to the designated parking lot (S12, "No"), the processing of the collection/delivery management server 10 proceeds to the processing in S18.

In the processing in S13, the collection/delivery management server 10 inquiries whether the vehicle may be moved to another parking lot that is near to the designated parking lot. The inquiry about vehicle movement is sent to the requesting-user terminal 40. For example, the collection/delivery management server 10 notifies that it is difficult for the collection/delivery vehicle to reach and enter the parking lot designated by the requesting user. At the same time, the collection/delivery management server 10 presents, on the map, the information on another parking lot that the collection/delivery vehicle can reach and enter and, then, inquires whether the vehicle 30 may be moved. More specifically, as an example of inquiry, an inquiry content message (text, voice, image, video, etc.) inquiring whether the vehicle 30 may be moved is sent to the requesting-user terminal 40. Sending an inquiry content message to the requesting-user terminal 40 is also referred to as "inquiring of the requesting-user terminal 40 about something". The inquiry method that will be described below may be similar to that for inquiring whether the vehicle may be moved.

In the processing in S13, the collection/delivery management server 10 may include, as an option, an approval to issue an electronic key that can start the engine of the vehicle 30. When the requesting user is the owner of the vehicle 30, this electronic key allows the collection/delivery staff to move the vehicle from the designated parking lot, to store or collect a collection/delivery item, to move the vehicle back to the designated parking lot again, and to lock the vehicle. This can provide more convenient collection/delivery services when the requesting user, who is the owner of the vehicle 30, cannot move the vehicle on the collection/delivery date and time or when the weight of the collection/delivery item is large and, in addition, the distance between the designated parking lot and another parking lot is relatively long.

In the processing in S14, the collection/delivery management server 10 determines whether vehicle movement is approved, based on the inquiry to the requesting user about vehicle movement or based on the result of inquiry to the requesting user about approval to issue an electronic key that can start the engine of the vehicle 30. If it is permitted by the requesting user to move the vehicle or to issue an electronic key that can start the engine of the vehicle 30, the collection/delivery management server 10 determines that vehicle movement from the designated parking lot to another parking lot is approved. If it is not permitted by the requesting user to move the vehicle or to issue an electronic key that can start the engine of the vehicle 30, the collection/delivery management server 10 determines that vehicle movement is not approved. If vehicle movement is approved (S14, "Yes"), the processing of the collection/delivery management server 10 proceeds to the processing in S15. On the other hand, if vehicle movement is not approved (S14, "No"), the processing of the collection/delivery management server 10 proceeds to the processing in S18.

In the processing in S15, it is determined whether the other parking lot to which the requesting user has approved to move the vehicle is a pay parking lot or a free parking lot. If it is determined that the parking lot is a pay parking lot (S15, "pay"), the processing of the collection/delivery management server 10 proceeds to the processing in S16. On the other hand, if the parking lot is a free parking lot (S15, "free"), the processing of the collection/delivery management server 10 proceeds to the processing in S19.

In the processing in S16, the collection/delivery management server 10 inquires of the requesting user about the payment of the expense incurred in the processing in S8 or S15. The inquiry about the payment of the expense is sent to the requesting-user terminal 40. For example, in the case of processing in S8, the collection/delivery management server 10 notifies that the expense incurs when entering the designated parking lot and inquires of the requesting user whether the requesting user has an intention to pay. Similarly, in the case of processing in S15, the collection/delivery management server 10 notifies that the expense incurs when using the other parking lot to which the requesting user has approved to move the vehicle and inquires of the requesting user whether the requesting user has an intention to pay.

In the processing in S17, the collection/delivery management server 10 determines whether the requesting user has approved the payment of expense based on the result of inquiry about the payment of expense incurred in the processing in S8 or S15. If the requesting user has an intention to pay the expense incurred in the processing in S8 or S15, the collection/delivery management server 10 determines that the payment of expense is approved. If the requesting user has an intention to refuse the payment of expense incurred in the processing in S8 or S15, the collection/delivery management server 10 determines that the payment of expense is not approved. If the payment of expense is approved (S17, "Yes"), the processing of the collection/delivery management server 10 proceeds to the processing in S19. On the other hand, if the payment of expense is not approved (S17, "No"), the processing of the collection/delivery management server 10 proceeds to the processing in S18.

In the processing in S18, the collection/delivery management server 10 notifies the requesting user that the requested collection/delivery cannot be carried out. The notification that the requested collection/delivery cannot be carried out is sent to the requesting-user terminal 40. For example, the collection/delivery management server 10 sends a message requesting the input of next-time delivery information such as "Collection/delivery item will be delivered at a later date. Please enter information on next-time delivery", together with a message indicating that the requested collection/delivery cannot be carried out. After the processing in S18, the processing shown in FIG. 5 and FIG. 6 is terminated.

In the processing in S19, the collection/delivery management server 10 determines the collection/delivery destination of the collection/delivery item requested for collection/delivery and the expense that will incur. Then, the collection/delivery management server 10 notifies the requesting user about the collection/delivery destination of the determined collection/delivery item and the breakdown of the expense that will incur. For example, if the collection/delivery vehicle can travel on the route to the designated parking lot (entrance of the parking lot) and if there is no restriction when the collection/delivery vehicle enters the designated parking lot, the designated parking lot is notified as the collection/delivery destination. If the designated parking lot is a pay parking lot, the expense that will incur upon entering the designated parking lot is notified. If vehicle movement to another parking lot near to the designated parking lot is approved, the other parking lot is notified as the collection/delivery destination of the collection/delivery item and, at the same time, the expense that will incur when using the other parking lot is notified.

After the processing in S19, the collection/delivery management server 10 registers the information on the collection/delivery of the collection/delivery item, received from the requesting user in the processing in S2, in the collection/delivery management DB 200 (S20). For example, the collection/delivery management server 10 assigns unique identification information to the vehicle 30 designated as the collection/delivery destination and registers the identification information in the collection/delivery management information. The collection/delivery date and the collection/delivery time zone, acquired from the requesting user, is stored in the collection/delivery date/time field of the collection/delivery management information. Similarly, the classification of the requested collection/delivery is stored in the collection/delivery classification field of the collection/delivery management information, and "uncompleted" is stored in the collection/delivery status field. The size (vertical width, horizontal width, depth, etc.), weight, etc., of the collection/delivery item are stored in the baggage attribute field of the collection/delivery management information, and the unique identification information, assigned to the requesting user, is stored in the user ID field. The information for identifying the requesting-user terminal 40 (telephone number, IP address, MAC address, etc.) is stored in the user terminal field, and the storage position of the collection/delivery item, acquired from the requesting user, is stored in the collection/delivery position field. The address of the designated parking lot is stored in the parking lot address field, and the latitude and longitude indicating the parking position of the vehicle 30 is stored in the vehicle position field. The various statuses of the collection/delivery determined in the processing from S7 to S17 are stored in the restriction field of the collection/delivery management information. For example, the information on the acquisition of permission to enter the designated parking lot, prohibition of entry into the designated parking lot, type of the other parking lot (pay or free) used for collection/delivery, permission of vehicle movement including the issuance of the engine start key, and so on are stored in the restriction field. After the processing in S20, the processing in FIG. 5 and FIG. 6 is terminated.

If the designated parking lot included in the information on the collection/delivery of a collection/delivery item, received from the requesting user, is a pay parking lot, the collection/delivery management server 10 may omit the processing in S16-S17 assuming that the payment of expense is approved in advance. In addition, if it is possible for the requesting user to drive the vehicle to move it, the collection/delivery management server 10 may provide information on the route, identified for example in the processing in S11, to the car navigation device mounted on the vehicle 30 via the center server 20. The information on the route is provided to the car navigation device mounted on the vehicle 30 via the communication device 32 mounted on the vehicle. The information on the route to the other parking lot, if provided in this way, allows the requesting user to move to the other parking lot at the destination based on the information on route provided from the collection/delivery management server 10 via the center server 20. The information, stored in the collection/delivery management DB 200 as the collection/delivery management information, is notified to the collection/delivery staff terminal 50 as described in FIG. 3. The information on the vehicle 30 includes the information acquired by the collection/delivery management server 10 via the center server 20. The processing from S4 to S19, executed by the collection/delivery management server 10 of the trunk share system 1, corresponds to an example of a management unit that determines whether the delivery vehicle carrying the collection/delivery item will be able to arrive at the parking position, where the vehicle is parked in the parking lot, based on the parking position information and the parking lot attribute information.

In the processing in FIG. 5 and FIG. 6, a collection/delivery request that is sent from the requesting-user terminal 40 to collect/deliver a collection/delivery item has been described. A server providing an online shopping site and the collection/delivery management server 10 may cooperate to perform the above processing procedure for the requesting user. For example, when a requesting user designates the vehicle 30 as the delivery destination of a purchased item in an online shopping site, the server of the site accesses the collection/delivery management server 10 for requesting the collection/delivery of the collection/delivery item. The information on the collection/delivery of a collection/delivery item is specified also when the server of the online shopping site makes a collection/delivery request for a collection/delivery item. The collection/delivery management server 10 executes the processing from S2 to S20 based on the information on the collection/delivery of the collection/delivery item acquired from the server of the online shopping site. Note that the inquiry about vehicle movement in S13 and the inquiry about the payment of expense in S16 are performed via the server of the online shopping site. The server of the online shopping site sends the above inquiry to the requesting-user terminal 40 to confirm the intention of the requesting user for the inquiry. After that, the server of the online shopping site acquires a response to the above inquiry from the requesting-user terminal 40 and notifies the collection/delivery management server 10 about the intention of the requesting user based on the response. The result of the processing in FIG. 5 and FIG. 6 is notified in the similar way. The information on the determined collection/delivery destination of a collection/delivery item, the breakdown of incurred expense, or the prohibition of collection/delivery is notified to the requesting-user terminal 40 via the server of the online shopping site.

Next, the flow of the collection/delivery processing using the key information in the trunk share system 1 will be described. FIG. 7 is a sequence diagram showing an example of the flow of collection/delivery processing preformed for the vehicle 30 using key information. FIG. 7 shows an example in which the center server 20 that has received a key information issuance request from the collection/delivery management server 10 issues key information. In the collection/delivery processing shown in the sequence diagram of FIG. 7, it is assumed that the information (vehicle manufacturer name, vehicle type, color or vehicle image, number, etc.) that identifies the vehicle 30 used as the collection/delivery destination, the parking position information (parking lot address, parking position, etc.), the storage position of a collection/delivery item, and the restrictions have been notified to the collection/delivery staff terminal 50.

For example, on the specified delivery date and time, the collection/delivery staff arrives at the parking position of the vehicle 30, which is designated as the collection/delivery destination, while checking the address, indicated by the parking position information, using the car navigation device. When the vehicle 30 designated as the collection/delivery destination is identified from the information that identifies the vehicle 30, the collection/delivery staff uses the collection/delivery staff terminal 50 to send an key information issuance request, which unlocks/locks the baggage room door or the vehicle interior door corresponding to the storage position of the collection/delivery item, to the collection/delivery management server 10 (S31). The key information issuance request from the collection/delivery staff terminal 50 includes at least the information that identifies the vehicle 30 designated as the delivery destination.

Upon receiving the key information issuance request from the collection/delivery staff terminal 50, the collection/delivery management server 10 requests the center server 20 to issue a one-time key. The collection/delivery management server 10 identifies the collection/delivery management information on the vehicle 30 based on the information that identifies the vehicle 30 and that is included in the key information issuance request from the collection/delivery staff terminal 50 and then identifies the storage position (collection/delivery position) of the collection/delivery item. Then, the collection/delivery management server 10 requests the center server 20 to issue a one-time key that includes the storage position information on the collection/delivery item and the identification information on the vehicle 30 (S32).

The center server 20 receives the one-time key issuance request sent from the collection/delivery management server 10 and issues the key information (S33). The center server 20 issues the key information, which allows the collection/delivery staff terminal 50 to function as a temporary electronic key, based at least on the vehicle identification information on the vehicle 30 included in the one-time key issuance request, the storage position information on the collection/delivery item, and the time information when the issue request was received. The issuance of key information according to the storage position information on the collection/delivery item, such as the one described above, may be set in advance between the collection/delivery management server 10 and the center server 20. The center server 20 can issue the key information corresponding to the storage position of the collection/delivery item (for example, bonnet, passenger seat, passenger seat side rear seat, driver's seat rear seat, baggage room).

After the center server 20 delivers the issued key information to the collection/delivery management server 10 as a one-time key, the collection/delivery management server 10 delivers the one-time key, delivered from the center server 20, to the collection/delivery staff terminal 50 (S34). The collection/delivery staff terminal 50 receives the one-time key, delivered from the collection/delivery management server 10, and temporarily stores the received one-time key in a predetermined area of the main storage device 52 (S35). Note that the one-time key may be issued directly from the center server 20 to the collection/delivery staff terminal 50.

The collection/delivery staff causes the collection/delivery staff terminal 50, in which the key information is stored, to operate as a temporary electronic key and sends the request for unlocking the door corresponding to the storage position of the collection/delivery item (S36). The key unit 80 of the in-vehicle device 31, mounted on the vehicle 30, authenticates the unlocking request received from the collection/delivery staff terminal 50. If the authentication is successful, the key unit 80 sends the locking/unlocking signal and the key ID to the locking/unlocking device 90. The locking/unlocking device 90 performs the unlocking processing according to the locking/unlocking signal and the key ID, sent from the key unit 80, to unlock the door corresponding to the collection/delivery position of the vehicle 30 (S37). The unlocking notification is sent from the in-vehicle device 31 to the collection/delivery staff terminal 50 and the collection/delivery management server 10 (S38). The collection/delivery management server 10 may acquire the information on the time, at which the unlocking notification was notified, and record the time information in the collection/delivery management information on the vehicle 30. The collection/delivery staff opens/closes the unlocked door of the vehicle 30 to store the delivery item in the storage position or collect the collection item stored in the storage position and, then, locks the door (S39). When locking the door, the processing similar to the processing described in S37 and S38 is performed (S40, S41). The collection/delivery staff sends the collection/delivery completion notification to the collection/delivery management server 10 via the collection/delivery staff terminal 50 (S42). In the collection/delivery management server 10, the time information on the receipt of the collection/delivery completion notification is recorded in the collection/delivery management information on the vehicle 30 and, at the same time, "completed" status is recorded in the collection/delivery status field corresponding to the collection/delivery date/time (S43).

The collection/delivery management server 10 invalidates the one-time key held in the collection/delivery staff terminal 50 (S44). The collection/delivery management server 10 outputs an instruction to erase the key information, which is held, to the collection/delivery staff terminal 50, for example, when the collection/delivery completion notification is recorded in the collection/delivery management information. In the collection/delivery staff terminal 50, the key information corresponding to the one-time key, temporarily held in a predetermined area of the main storage device 52, is erased, for example, via the processing of the predetermined application that has received the key information erase instruction (S45). Note that the collection/delivery staff terminal 50 may erase the key information corresponding to the one-time key, temporarily held in a predetermined area of the main storage device 52, when the collection/delivery completion notification is sent.

The flow of the processing illustrated in FIG. 7 is applied similarly to the requesting-user terminal 40 of the requesting user who accepts a delivery item from, or stores a collection item in, the storage position.

As described above, when a collection/delivery request is received from a collection/delivery user, the collection/delivery management server 10 according to this embodiment can determine whether the delivery vehicle carrying a delivery item will be able to arrive at the parking position where the delivery vehicle is parked in the parking lot, based on the parking position information and the parking lot attribute information. As a result, the collection/delivery management server 10 according to this embodiment can provide a technique for improving the reliability of collection from, or delivery to, a vehicle parked in a predetermined place.

In addition, the collection/delivery management server 10 identifies the route information between the delivery vehicle and the parking position of the vehicle based on the parking position information. The collection/delivery management server 10 can determine whether the delivery vehicle carrying a collection/delivery item will be able to arrive at the parking position, where the vehicle is parked in the parking lot, based on one of the identified route information and the parking lot attribute information. For example, the collection/delivery management server 10 can determine whether the delivery vehicle will be able to arrive at the designated parking lot by taking into consideration at least the road information (road width, height limitation and weight limitation on passage) on the route leading to the designated parking lot and the regulation information. The collection/delivery management server 10 can also determine whether the delivery vehicle will be able to approach a position close enough to the vehicle parked in the designated parking lot. In this way, the collection/delivery management server 10 can increase the accuracy of the determination whether collection/delivery can be carried out for a vehicle parked in the designated parking lot.

In addition, as the parking lot attribute information, the collection/delivery management server 10 may include at least one of the information on height and weight limitations imposed when approaching the parking position, the information on the necessity of permission imposed when approaching the parking position, and the information on expense incurrence. Using the parking lot attribute information in this way, the collection/delivery management server 10 can increase the accuracy of determination whether the delivery vehicle carrying a collection/delivery item will be able to move close enough to the vehicle parked in the designated parking lot.

In addition, the collection/delivery management server 10 can identify a nearby parking lot near to the parking lot in which the vehicle is parked and, at the same time, send an inquiry to the terminal of a requesting user, who requests the collection/delivery of an collection/delivery item, whether the vehicle may be moved to the nearby parking lot. Using a nearby parking lot in this way, the collection/delivery management server 10 allows the requesting user to accept/deliver a collection/delivery item via the nearby parking lot near to the designated parking lot even if it is determined that the delivery vehicle will not be able to arrive at the designated parking lot, thus improving the convenience of a user who uses the collection/delivery service.

In addition, the collection/delivery management server 10 can identify a nearby parking lot near to the parking lot in which the vehicle is parked and, at the same time, send an inquiry to the terminal of a requesting user, who requests the collection/delivery of a collection/delivery, whether the vehicle may be moved to the nearby parking lot. Even if the user of the collection/delivery service cannot move the vehicle for some reason on the collection/delivery date and time, the function described above allows the collection/delivery staff to move the vehicle, parked in the designated parking lot, for collecting or delivering the collection/delivery item and, after the collection/delivery, return the vehicle back to the designated parking lot. As a result, the collection/delivery management server 10 can provide the collection/delivery service that is more convenient.

In addition, the collection/delivery management server 10 can inquire about the approval of an expense required to approach the parking position or an additional expense required to use a nearby parking lot near to the parking lot in which the vehicle is parked. As a result, the collection/delivery management server 10 can increase the usability of a requesting user.

<4. Variations>

The above-described embodiment is merely an example, and the present disclosure can be implemented by adding changes as needed without departing from the spirit of the present disclosure.

(First modification) In the embodiment, an example has been described in which the vehicle 30 is locked/unlocked by the locking/unlocking device 90 when the authentication processing is successfully performed by the key unit 80. In the first modification, the processing of the key unit 80 may be executed in the locking/unlocking device 90. That is, the locking/unlocking device 90 may include a control unit (ECU) for authenticating the authentication information received from the requesting-user terminal 40 or the like. This control unit may send the unlock command or the lock command to the body ECU 94 via an in-vehicle network such as CAN if the requesting-user terminal 40 or the like is successfully authenticated. The trunk share system 1 in the first modification makes it possible to provide the trunk share service without installing the key unit 80, making the configuration simpler.

(Second modification) In the embodiment, the requesting-user terminal 40 or the like receives the key information issued by the center server 20 and, if the requesting-user terminal 40 or the like is authenticated based on the received authentication information indicated by the received key information, the locking/unlocking signal is sent from the key unit 80 to the locking/unlocking device 90 to lock/unlock the vehicle 30. In the second modification, the authentication information is not the information that is used for authenticating the requesting-user terminal 40 or the like but the information that includes the information on the key ID for locking/unlocking the vehicle 30.

In this case, the requesting-user terminal 40 or the like receives the key information, which includes the key ID for locking/unlocking the vehicle 30, from the center server 20 and sends the received key ID, together with the locking/unlocking signal, to the locking/unlocking device 90. The locking/unlocking device 90 compares the received key ID with the key ID stored in advance in the locking/unlocking device 90 and, if the two key IDs match, locks/unlocks the vehicle 30. The key ID may be sent and received in the encrypted form between the requesting-user terminal 40 or the like and the center server 20 or between the requesting-user terminal 40 or the like and the locking/unlocking device 90. The center server 20 may generate a one-time key, for example, by encrypting the key ID as well as the time information using a predetermined algorithm. The locking/unlocking device 90 may decrypt the received one-time key using the same predetermined algorithm as the one used by the center server 20 and, then, compare the decrypted one-time key with the key ID stored in advance in the locking/unlocking device 90. When a predetermined time elapses from the receipt of the one-time key, the requesting-user terminal 40 or the like may delete the one-time key to invalidate it. The trunk share system 1 according to the second modification uses the one-time key, generated from the key ID and the time information, as the key information, thus allowing the center server 20 to send temporarily effective key information to the requesting-user terminal 40 or the like each time an issuance request is received.

(Third modification) In the embodiment and the second modification, the center server 20 sends the authentication information for the requesting-user terminal 40 or the like that corresponds to the fixed authentication information unique to the key unit 80 or the key ID stored in advance in the locking/unlocking device 90 of the vehicle 30. Note that the authentication information between the requesting-user terminal 40 or the like and the key unit 80 is not limited to the authentication information described above. For example, in the third modification, each time a key information issuance request is received from the requesting-user terminal 40 or the like, the center server 20 may generate new authentication information and issue the newly generated authentication information to the requesting-user terminal 40 or the like. In this case, the center server 20 may store the vehicle-side authentication information for the key unit 80, corresponding to the new authentication information, in the key unit 80 via the communication device 32. The key unit 80 is connected to the communication device 32 through an in-vehicle network such as CAN. Note that the center server 20 may generate the authentication information, which will be issued to the requesting-user terminal 40 or the like, using the identification information for identifying the vehicle 30 and the time information and, then, sends the authentication information and the time information to the requesting-user terminal 40 or the like. In this case, the key unit 80 of the vehicle 30 may generate the vehicle-side authentication information using the same algorithm as that of the center server 20. The requesting-user terminal 40 or the like may send the authentication information and the time information, issued as the key information, to the key unit 80 for authentication.

(Others) In the trunk share system 1 in the embodiment and the modifications, it is assumed that, when the vehicle 30 is locked/unlocked, the only baggage room door is locked/unlocked but the vehicle interior doors are not locked/unlocked but remain locked in consideration of security. However, for the vehicle 30 with a body structure in which the baggage room and the vehicle interior are not separated from each other (the type of vehicle commonly called minivan), not only the baggage room but also the vehicle interior may be accessed when the baggage room door is unlocked. As a result, the owner or the user of the vehicle 30 may have a security concern.

To address this problem, in the vehicle 30 where the baggage room and the vehicle interior are not separated, a drive recorder or the like capable of shooting the vehicle interior is provided to generate a video of the vehicle interior when the baggage room door is opened so that it can be determined, based on the generated video, whether a person has moved from the baggage room to the vehicle interior. For example, if it is determined that a person has moved from the baggage room to the vehicle interior, the ECU that controls the drive recorder stores the generated video, activates the in-vehicle alarm, notifies the security company, or notifies the owner of the vehicle. On the other hand, if it is determined that a person has not moved to the vehicle interior, the ECU may erase the generated video when the baggage room door is closed and locked. As a part of the user service, the drive recorder may send the generated video to the requesting-user terminal 40 providing the vehicle 30, regardless of whether a person has entered the vehicle interior.

<Computer readable recording medium> A program that carries out any one of the above-described functions on a device, such as an information processing device or another machine or device (hereinafter called a computer), can be recorded in a computer-readable recording medium. The computer can read a program from the computer-readable recording medium to execute the program for providing its function.

A computer readable recording medium refers to a recording medium that electrically, magnetically, optically, mechanically, or chemically stores information, such as data and programs, for later reading by a computer. Among those recording media, recording media removable from a computer include a flexible disk, a magneto-optical disk, a CD-ROM disc, a CD-R/W disc, a DVD disc, a Blu-ray disc, a DAT, an 8 mm tape, and memory cards such as a flash memory. In addition, recording media permanently connected to a computer include a hard disk, a ROM, and so on.

What is claimed is:

1. An information system that manages collection from and delivery to one or more areas in a vehicle that can be used as a collection-delivery destination of an item, the information system comprising:
   at least one processor configured to
   accept a request for collection of the item from the one or more areas and delivery of the item to the one or more areas;
   acquire parking position information and attribute information, the parking position information being related to a position of a designated vehicle, the attribute information being related to an attribute of a parking lot in which the designated vehicle is parked, and the designated vehicle being a vehicle designated as the collection-delivery destination of the item;
   determine whether a delivery vehicle carrying the item will be able to arrive at a parking position based on the parking position information and the attribute information, the parking position being a position where the designated vehicle is parked in the parking lot;

identify a nearby parking lot near to the parking lot in which the designated vehicle is parked, when the delivery vehicle is determined to be unable to arrive at the parking position;

inquire of a terminal of a requesting user whether a collection-delivery agent can move the designated vehicle to the nearby parking lot, the requesting user being a user who requests the collection of the item and the delivery of the item;

inquire of the terminal of the requesting user about an approval of issuance of key information used for moving the designated vehicle to the nearby parking lot; and upon approval of the issuance of the key information, issue the key information to a terminal of the collection-delivery agent, wherein the terminal of the collection-delivery agent transmits the key information to one or more in-vehicle device mounted on the designated vehicle that, in response to receiving the key information, i) causes the designated vehicle to unlock, ii) enables movement of the designated vehicle to the nearby parking lot, and iii) causes the designated vehicle to lock after the designated vehicle is moved to the nearby parking lot.

2. The information system according to claim 1, wherein the at least one processor is configured to output a result of determination indicating whether the delivery vehicle will be able to arrive at the parking position.

3. The information system according to claim 1, wherein the at least one processor is configured to determine whether the collection from and delivery to the areas will be carried out based on a result of determination indicating whether the delivery vehicle will be able to arrive at the parking position.

4. The information system according to claim 1, wherein the at least one processor is configured to:

identify route information between the delivery vehicle and the parking position based on the parking position information; and determine whether the delivery vehicle will be able to arrive at the parking position based on at least one of the route information and the attribute information.

5. The information system according to claim 4, wherein the route information includes at least one of traffic regulation information on a route between the delivery vehicle and the parking position and traffic restriction information on the route between the delivery vehicle and the parking position.

6. The information system according to claim 1, wherein the attribute information further includes at least one of information on necessity of permission for the vehicle to approach the parking position, information on height limitations imposed on the vehicle approaching the parking position, and information on expense incurrence.

7. The information system according to claim 1, wherein the at least one processor is configured to inquire of the terminal of the requesting user about at least one of an approval of an additional expense required to approach the parking position and an approval of an additional expense required to use the nearby parking lot near to the parking lot in which the designated vehicle is parked.

8. An information processing method comprising:

accepting, by a circuitry, a request for collection of an item from one or more areas in a vehicle and delivery of the item to the one or more areas, the circuitry being a circuitry of an information system that manages the collection from and delivery to the one or more areas, and the vehicle being a vehicle that can be used as a collection-delivery destination of the item;

acquiring, by the circuitry, parking position information and attribute information, the parking position information being related to a position of a designated vehicle, the attribute information being related to an attribute of a parking lot in which the designated vehicle is parked, and the designated vehicle being a vehicle designated as the collection-delivery destination of the item;

determining, by the circuitry, whether a delivery vehicle carrying the item will be able to arrive at a parking position based on the parking position information and the attribute information, the parking position being a position where the designated vehicle is parked in the parking lot;

identifying, by the circuitry, a nearby parking lot near to the parking lot in which the designated vehicle is parked, when the delivery vehicle is determined to be unable to arrive at the parking position;

inquiring, by the circuitry, of a terminal of a requesting user whether a collection-delivery agent can move the designated vehicle to the nearby parking lot, the requesting user being a user who requests the collection of the item and the delivery of the item;

inquiring, by the circuitry, of the terminal of the requesting user about an approval of issuance of key information used for moving the designated vehicle to the nearby parking lot; and upon approval of the issuance of the key information, issuing, by the circuitry, the key information to a terminal of the collection-delivery agent, wherein the terminal of the collection-delivery agent transmits the key information to one or more in-vehicle device mounted on the designated vehicle that, in response to receiving the key information, i) causes the designated vehicle to unlock, ii) enables movement of the designated vehicle to the nearby parking lot, and iii) causes the designated vehicle to lock after the designated vehicle is moved to the nearby parking lot.

9. The information processing method according to claim 8, further comprising:

determining, by the circuitry, whether the collection from and delivery to the areas will be carried out based on a result of determination indicating whether the delivery vehicle will be able to arrive at the parking position.

10. The information processing method according to claim 8, further comprising:

determining, by the circuitry, whether the delivery vehicle will be able to arrive at the parking position based on at least one of route information between the delivery vehicle and the parking position and the attribute information.

11. The information processing method according to claim 10, wherein the route information includes at least one of traffic regulation information on a route between the delivery vehicle and the parking position and traffic restriction information on the route between the delivery vehicle and the parking position.

12. The information processing method according to claim 8, wherein the attribute information further includes at least one of information on necessity of permission for the vehicle to approach the parking position, information on height limitations imposed on the vehicle approaching the parking position, and information on expense incurrence.

13. The information processing method according to claim 8, further comprising:

inquiring, by the circuitry, of the terminal of the requesting user about at least one of an approval of an additional expense required to approach the parking position and an approval of an additional expense required to use the nearby parking lot near to the parking lot in which the designated vehicle is parked.

14. A non-transitory storage medium storing a program wherein the program causes a circuitry of an information system that manages collection from and delivery to one or more areas in a vehicle that can be used as a collection-delivery destination of an item to:

accept a request for collection of the item from the one or more areas and delivery of the item to the one or more areas;

acquire parking position information and attribute information, the parking position information being related to a position of a designated vehicle, the attribute information being related to an attribute of a parking lot in which the designated vehicle is parked, and the designated vehicle being a vehicle designated as the collection-delivery destination of the item;

determine whether a delivery vehicle carrying the item will be able to arrive at a parking position based on the parking position information and the attribute information, the parking position being a position where the designated vehicle is parked in the parking lot;

identify a nearby parking lot near to the parking lot in which the designated vehicle is parked, when the delivery vehicle is determined to be unable to arrive at the parking position;

inquire of a terminal of a requesting user whether a collection-delivery agent can move the designated vehicle to the nearby parking lot, the requesting user being a user who requests the collection of the item and the delivery of the item;

inquire of the terminal of the requesting user about an approval of issuance of key information used for moving the designated vehicle to the nearby parking lot; and upon approval of the issuance of the key information, issue the key information to a terminal of the collection-delivery agent, wherein the terminal of the collection-delivery agent transmits the key information to one or more in-vehicle device mounted on the designated vehicle that, in response to receiving the key information, i) causes the designated vehicle to unlock, ii) enables movement of the designated vehicle to the nearby parking lot, and iii) causes the designated vehicle to lock after the designated vehicle is moved to the nearby parking lot.

15. The storage medium according to claim 14, wherein the program further causes the circuitry to determine whether the collection from and delivery to the areas will be carried out based on a result of determination indicating whether the delivery vehicle will be able to arrive at the parking position.

16. The storage medium according to claim 14, wherein the program causes the circuitry to determine whether the delivery vehicle will be able to arrive at the parking position based on at least one of route information between the delivery vehicle and the parking position and the attribute information.

17. The storage medium according to claim 16, wherein the route information includes at least one of traffic regulation information on a route between the delivery vehicle and the parking position and traffic restriction information on the route between the delivery vehicle and the parking position.

18. The storage medium according to claim 14, wherein the attribute information further includes at least one of information on necessity of permission for the vehicle to approach the parking position, information on height limitations imposed on the vehicle approaching the parking position, and information on expense incurrence.

19. The storage medium according to claim 14, wherein the program causes the circuitry to inquire of the terminal of the requesting user about at least one of an approval of an additional expense required to approach the parking position and an approval of an additional expense required to use the nearby parking lot near to the parking lot in which the designated vehicle is parked.

20. The information system according to claim 1, wherein
information on a route to the nearby parking lot is provided to a navigation device installed in the designated vehicle when the issuance of the key information is approved, and
the designated vehicle is moved to the nearby parking lot using the information on the route.

* * * * *